(12) United States Patent
Yoshimura et al.

(10) Patent No.: US 12,532,210 B2
(45) Date of Patent: Jan. 20, 2026

(54) CHANNEL STATE INFORMATION PROCESSING IN COMMUNICATION NETWORKS

(71) Applicant: SHARP KABUSHIKI KAISHA, Osaka (JP)

(72) Inventors: Tomoki Yoshimura, Camas, WA (US); Zhanping Yin, Vancouver, WA (US); Rudraksh Shrivastava, Erligheim (DE); Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 340 days.

(21) Appl. No.: 18/448,928

(22) Filed: Aug. 12, 2023

(65) Prior Publication Data
US 2025/0056280 A1    Feb. 13, 2025

(51) Int. Cl.
*H04W 24/10* (2009.01)
(52) U.S. Cl.
CPC .................. *H04W 24/10* (2013.01)
(58) Field of Classification Search
CPC .................................................. H04W 24/10
See application file for complete search history.

(56) References Cited

U.S. PATENT DOCUMENTS

| | | | | |
|---|---|---|---|---|
| 2019/0349120 | A1* | 11/2019 | Cheng | H04L 5/0053 |
| 2020/0358504 | A1* | 11/2020 | Takeda | H04L 5/0055 |
| 2021/0050897 | A1* | 2/2021 | Huang | H04L 5/0055 |
| 2023/0069141 | A1* | 3/2023 | Yoshioka | H04L 5/0037 |
| 2023/0090907 | A1* | 3/2023 | Dimou | H04L 5/0055 370/336 |
| 2023/0318686 | A1* | 10/2023 | Kwak | H04B 7/0639 455/101 |
| 2025/0038919 | A1* | 1/2025 | Lin | H04L 5/0094 |
| 2025/0141515 | A1* | 5/2025 | Lee | H04B 17/373 |
| 2025/0260448 | A1* | 8/2025 | Wang | H04L 43/065 |

* cited by examiner

*Primary Examiner* — Hashim S Bhatti
(74) *Attorney, Agent, or Firm* — ScienBiziP, P.C.

(57) ABSTRACT

A user equipment (UE) that includes one or more non-transitory computer-readable media storing one or more computer-executable instructions for processing channel state information (CSI) and at least one processor coupled to the one or more non-transitory computer-readable media is provided. The processor is configured to execute the one or more computer-executable instructions to cause the UE to receive information from a base station (BS) regarding a plurality of occasions to transmit a CSI report at each of the plurality of occasions; transmit, to the BS, the CSI report at first occasions of the plurality of occasions; transmit a message to the BS regarding one or more durations to forgo processing the CSI for the CSI report; and forgo processing the CSI for second occasions of the plurality of occasions that are within the one or more durations.

15 Claims, 18 Drawing Sheets

| Subcarrier-spacing configuration 201 | Number of OFDM symbols per slot 202 | Slots per frame 203 | Slots per subframe for normal cyclic prefix 204 |
|---|---|---|---|
| $u$ | $N^{slot}_{symb}$ | $N^{frame,u}_{slot}$ | $N^{subframe,u}_{slot}$ |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Figure 2A

| Subcarrier-spacing configuration 201 | Number of OFDM symbols per slot 202 | Slots per frame 203 | Slots per subframe for extended cyclic prefix 205 |
|---|---|---|---|
| $u$ | $N^{slot}_{symb}$ | $N^{frame,u}_{slot}$ | $N^{subframe,u}_{slot}$ |
| 2 | 12 | 40 | 4 |

Figure 2B

CHANNEL STATE INFORMATION PROCESSING IN COMMUNICATION NETWORKS

TECHNICAL FIELD

The technology generally relates to wireless communications, and more particularly channel state information (CSI) processing.

BACKGROUND

With the tremendous growth in the number of connected devices and the rapid increase in user/network (NW) traffic volume, various efforts have been made to improve different aspects of wireless communication for next-generation wireless communication systems, such as fifth-generation (5G) New Radio (NR), by improving data rate, latency, reliability, and mobility.

The 5G NR system is designed to provide flexibility and configurability to optimize NW services and types, thus accommodating various use cases, such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communications in the next-generation wireless communication systems.

SUMMARY

In a first aspect of the present application, a user equipment (UE) is provided. The UE includes one or more non-transitory computer-readable media storing one or more computer-executable instructions for processing channel state information (CSI) and at least one processor coupled to the one or more non-transitory computer-readable media. The at least one processor is configured to execute the one or more computer-executable instructions to cause the UE to receive first information from a base station (BS) regarding a plurality of occasions to transmit a CSI report at each of the plurality of occasions; receive second information from the BS to identify one or more durations during which the UE determines whether to forgo processing the CSI for the CSI report; process the CSI for first occasions of the plurality of occasions that are not within the one or more durations; and forgo processing the CSI for second occasions of the plurality of occasions that are within the one or more durations.

In an implementation of the first aspect, the at least one processor is further configured to execute the one or more instructions to cause the UE to transmit the CSI report at the first occasions.

In another implementation of the first aspect, the first information is received through one of a radio resource control (RRC) message, a medium access control (MAC) control element (CE), or a downlink control information (DCI).

In another implementation of the first aspect, the second information is received through one of an RRC message, a MAC CE, or a DC.

In another implementation of the first aspect, the first and second information are received through a same one of an RRC message, a MAC CE, or a DCI.

In another implementation of the first aspect, forgoing processing the CSI includes forgoing updating the CSI for the CSI report.

In another implementation of the first aspect, forgoing processing the CSI further includes forgoing transmitting the CSI report to the BS at the second occasions.

In another implementation of the first aspect, foregoing processing the CSI further includes transmitting a previously transmitted CSI report to the BS at the second occasions.

In another implementation of the first aspect, foregoing processing the CSI includes transmitting the CSI report to the BS at the second occasions, wherein the CSI report includes a channel quality indicator (CQI) field including a specific code point indicating that a channel quality of a link from the BS to the UE is below a threshold.

In another implementation of the first aspect, foregoing processing the CSI includes transmitting the CSI report to the BS at the second occasions, the CSI report includes a combination of a first specific code point of a CQI field and a second specific code point of a rank indicator (RI) field, the first specific code point is '0' in decimal number, and the second specific code point is one of a code point indicating a maximum transmission rank and a code point that is reserved, or is not used, for the CSI report.

In another implementation of the first aspect, the CSI report conveys information related to the propagation path between the UE and the BS.

In another implementation of the first aspect, the at least one processor is further configured to execute the one or more instructions to cause the UE to: transmit a capability report to the BS indicating information associated with the one or more durations in terms of one or more of a length of the durations and a periodicity of the durations; and receive the information to identify the one or more durations from the BS in response to transmitting the capability report.

In another implementation of the first aspect, the UE further includes: a higher-layer processing unit configured to transmit an indication to forgo processing the CSI; and a wireless transmission and reception unit configured to process the CSI for the CSI report for the first occasions even after receiving the indication from the higher-layer processing unit.

In another implementation of the first aspect, the UE further includes: a higher-layer processing unit configured to transmit an indication to forgo processing the CSI; and a wireless transmission and reception unit configured to forgo processing the CSI for the CSI report for the second occasions after receiving the indication from the higher-layer processing unit.

In a second aspect of the present application, a method of processing CSI by a UE is provided. The method includes: receiving first information from BS regarding a plurality of occasions to transmit a CSI report at each of the plurality of occasions; receiving second information from the BS to identify one or more durations during which the UE determines whether to forgo processing the CSI for the CSI report; processing the CSI for first occasions of the plurality of occasions that are not within the one or more durations; and forgoing processing the CSI for second occasions of the plurality of occasions that are within the one or more durations.

In a third aspect of the present application, a UE that includes one or more non-transitory computer-readable media storing one or more computer-executable instructions for processing CSI is provided. The UE also includes at least one processor coupled to the one or more non-transitory computer-readable media. The at least one processor is configured to execute the one or more computer-executable instructions to cause the UE to: receive information from a BS regarding a plurality of occasions to transmit a CSI report at each of the plurality of occasions; transmit, to the BS, the CSI report at first occasions of the plurality of occasions; transmit a message to the BS regarding one or more durations to forgo processing the CSI for the CSI report; and forgo processing the CSI for second occasions of the plurality of occasions that are within the one or more durations.

In an implementation of the third aspect, the at least one processor is further configured to execute the one or more instructions to cause the UE to process the CSI for third occasions of the plurality of occasions that are not within the one or more durations after transmitting the message to the BS.

In another implementation of the third aspect, the at least one processor is further configured to execute the one or more instructions to cause the UE to determine an offset that starts after transmitting the message, where a first one of the one or more durations starts after the offset.

In another implementation of the third aspect, receiving information from the BS includes receiving the information from the BS through one of an RRC message, a MAC CE, or a DCI.

In another implementation of the third aspect, transmitting the message to the BS includes transmitting the message to the BS through one of an RRC message, a MAC CE, or a DCI.

In another implementation of the third aspect, forgoing processing the CSI includes forgoing updating the CSI for the CSI report.

In another implementation of the third aspect, the UE further includes: a higher-layer processing unit configured to transmit an indication to forgo processing the CSI; and a wireless transmission and reception unit configured to forgo processing the CSI for the CSI report for the second occasions after receiving the indication from the higher-layer processing unit.

In a fourth aspect of the present application, a method of processing CSI by a UE is provided. The method includes: receiving information from a BS regarding a plurality of occasions to transmit a CSI report at each of the plurality of occasions; transmitting a message to the BS regarding processing the CSI for the CSI report; determining one or more durations to forgo processing the CSI; processing the CSI for first occasions of the plurality of occasions that are not within the one or more durations; and forgoing processing the CSI for second occasions of the plurality of occasions that are within the one or more durations.

In a fifth aspect of the present application, a UE that includes one or more non-transitory computer-readable media storing one or more computer-executable instructions for processing CSI, and at least one processor coupled to the one or more non-transitory computer-readable media is provided. The at least one processor is configured to execute the one or more computer-executable instructions to cause the UE to: receive information from a BS regarding a plurality of occasions to transmit a CSI report at each of the plurality of occasions; transmit, to the BS, the CSI report at first occasions of the plurality of occasions, the CSI report containing an information field including first information regarding a propagation path between the UE and the BS; and transmit, to the BS, the CSI report at a second occasion, the CSI report containing the information field including second information regarding forgoing processing the CSI for the CSI report during one or more durations.

In an implementation of the fifth aspect, the at least one processor is further configured to execute the one or more instructions to cause the UE to forgo processing the CSI for third occasions of the plurality of occasions that are within the one or more durations after transmitting the CSI report at the second occasion.

In another implementation of the fifth aspect, forgoing processing the CSI includes forgoing updating the CSI for the CSI report.

In another implementation of the fifth aspect, the at least one processor is further configured to execute the one or more instructions to cause the UE to: determine an offset that starts after transmitting the CSI report at the second occasion, where a first one of the one or more durations starts after the offset.

In another implementation of the fifth aspect, the second information is transmitted using a first specific code point of a CQI field and a second specific code point of an RI field.

In another implementation of the fifth aspect, the second information is transmitted using a code point '0' in decimal number of the CQI field and a specific code point that indicates a maximum transmission rank configured for a CSI report of the RI field.

In another implementation of the fifth aspect, the UE further includes: a higher-layer processing unit configured to transmit an indication to forgo processing the CSI; and a wireless transmission reception unit configured to forego processing the CSI for the third occasions in response to receiving the indication.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIGS. 2A and 2B are two diagrams illustrating parameters related to subcarrier spacing (SCS)-specific carriers, according to an example implementation of the present disclosure.

DETAILED DESCRIPTION

Figure 1:
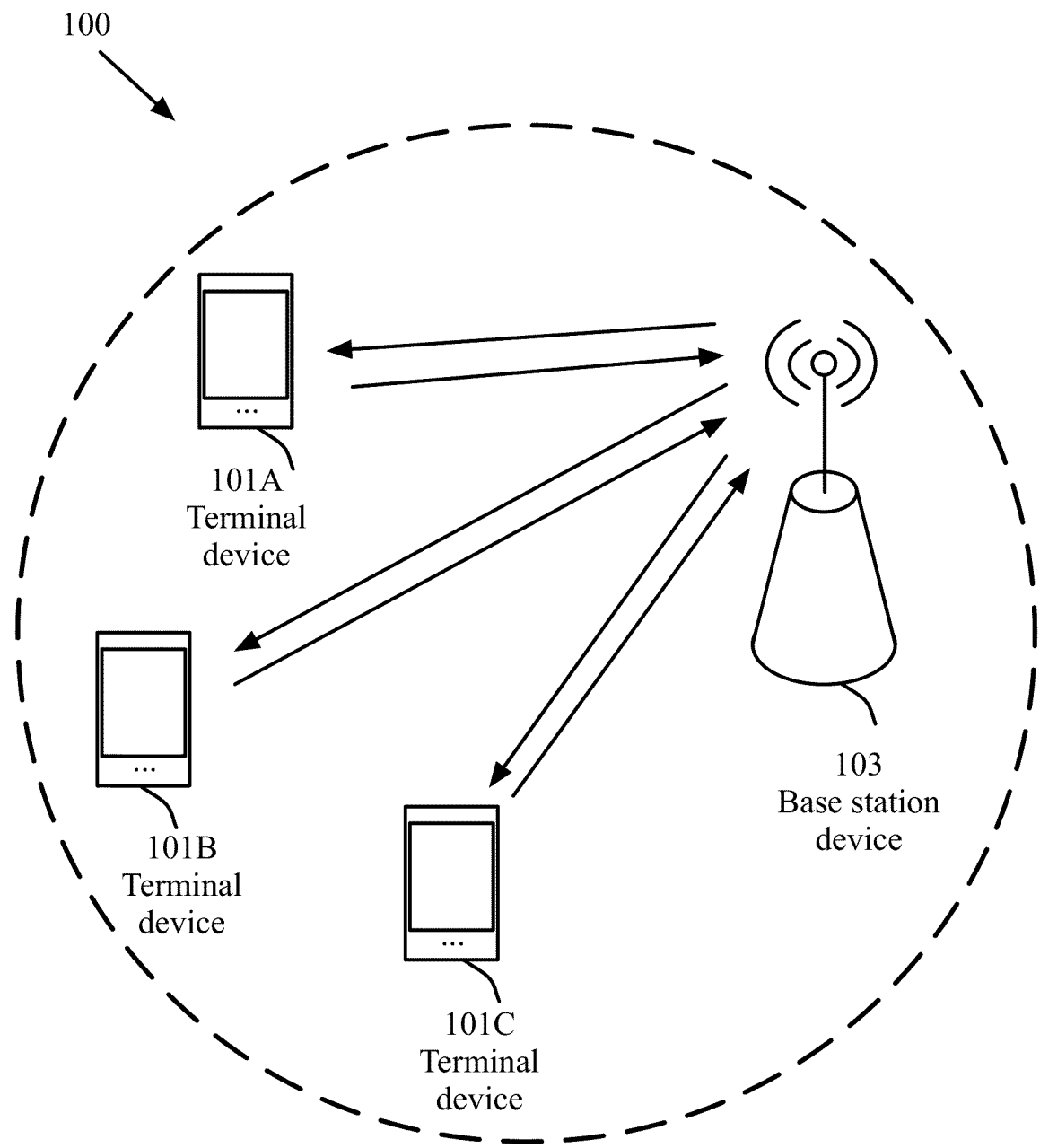
FIG. 1 is a schematic diagram illustrating a wireless communication system, according to an example implementation of the present disclosure.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not shown) by the same numerals in the example figures. However, the features in different implementations may differ in other respects, and thus may not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

As used herein, the term "and/or" should be interpreted to mean one or more items. For example, the phrase "A, B and/or C" should be interpreted to mean any of: only A, only B, only C. A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

Additionally, for the purposes of explanation and non-limitation, specific details, such as functional entities, techniques, protocols, standard, and the like are set forth for providing an understanding of the described technology. In other examples, detailed descriptions of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software, or a combination of software and hardware. Described functions may correspond to modules which may be software, hardware, firmware, or any combination thereof. The software implementation may include computer executable instructions stored on a computer-readable medium, such as a memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of one or more Application-Specific Integrated Circuits (ASICs), programmable logic arrays, and/or one or more Digital Signal Processor (DSPs). Although some of the example implementations described in this specification are oriented to software installed and executing on computer hardware, nevertheless, alternative example implementations implemented as firmware, as hardware, or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE (or a terminal device) may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSc) or Vehicle to Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, a Master Cell Group (MCG) may be formed by an MN, and a Secondary Cell Group (SCG) may be formed by an SN. In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise, the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with the CA/DC, may communicate with only one serving cell (SCell) which may be the primary cell. Conversely, for a UE in the RRC_CONNECTED state that is configured with the CA/DC a set of serving cells including the special cell(s) and all of the secondary cells may communicate with the UE.

Some mathematical expressions used in the present application are provided below.

Floor (CX) represents a floor function for the real number CX. For example, floor (CX) may represent a function that provides the largest integer within a range that does not exceed the real number CX.

Ceil (DX) represents a ceiling function to a real number DX. For example, ceil (DX) may be a function that provides the smallest integer within the range not less than the real number DX.

Mod (EX. FX) represents a function that provides the remainder obtained by dividing EX by FX.

Exp (GX) represents $e^{GX}$. Here, e is the Napier number. Also, $(HX)^{(IX)}$ indicates IX to the power of HX.

According to one aspect of the present embodiment, a waveform formed based on the OFDM may be used in a wireless communication system. An OFDM symbol defines a unit in the time domain of the waveform. Each OFDM symbol is converted to a time-continuous signal during a baseband signal generation. For example, the CP-OFDM may be used in the downlink direction of the wireless communication system. For example, either CP-OFDM or Discrete Fourier Transform-spread-Orthogonal Frequency Division Multiplex (DFT-s-OFDM) may be used in the uplink direction of the wireless communication system.

FIG. 1 is a schematic diagram illustrating a wireless communication system, according to an example implementation of the present disclosure. In FIG. 1, the wireless communication system 100 includes the terminal devices 101A to 101C and the base station device 103 (BS 103). The terms base station device, base station, and BS herein may be used interchangeably. The terms terminal device, user equipment, and UE herein may be used interchangeably.

BS 103 may include one or more transmission/reception devices. When BS 103 is configured of multiple transmission/reception devices, each of the multiple transmission/reception devices may be arranged at a different position. A transmission/reception device may include a transmission device and/or a reception device.

BS 103 may be configured to serve wireless communication by providing one or more cells. A cell is defined as a set of resources used for a wireless communication. A cell may include one or both of a downlink component carrier and an uplink component carrier. A serving cell may include a downlink component carrier and two or more uplink component carriers. A downlink component carrier and an uplink component carrier are also referred to as component carriers.

One or more SCS-specific carriers may be associated with one component carrier. Each SubCarrier Spacing-specific (SCS-specific) carrier defines a carrier for a subcarrier-spacing configuration. For example, one SCS-specific carrier may be associated with either a downlink component carrier or an uplink component carrier. In another example, one SCS-specific carrier may be associated with both a downlink component carrier and an uplink component carrier.

FIGS. 2A and 2B are two diagrams illustrating parameters related to subcarrier spacing (SCS)-specific carriers, according to an example implementation of the present disclosure. In FIGS. 2A and 2B, u 201 represents the subcarrier-spacing configuration. $N^{slot}_{symb}$ 202 represents the number of OFDM symbols in a slot. $N^{frame, u}_{slot}$ 203 represents the number of slots in a radio frame. $N^{subframe, u}_{slot}$ 204 and $N^{subframe, u}_{slot}$ 205 represent the number of slots in a subframe for normal cyclic prefix and extended cyclic prefix, respectively.

In FIG. 2A, for example, when the subcarrier-spacing configuration u 201 is set to 2 and the CP configuration is set to normal CP (Cyclic Prefix), the parameters are set to $N^{slot}_{symb}=14$, $N^{frame, u}_{slot}=40$, and $N^{subframe, u}_{slot}=4$. Further, in FIG. 2B, for example, when the subcarrier-spacing configuration u 201 is set to 2 and the CP configuration is set to an extended CP, the parameters are set to $N^{slot}_{symb}=12$, $N^{frame, u}_{slot}=40$, $N^{subframe, u}_{slot}=4$.

Time unit $T_c$ represents the length of the time domain. The time unit $T_c$ may be calculated by $1/(df_{max}*N_f)$, where $df_{max}$ represents 480 kHz and $N_f=4096$. The constant k may be calculated by $df_{max}*N_f/(df_{ref}N_{f, ref})$. The constant k is 64 when $df_{ref}$ is 15 kHz and $N_{f, ref}$ is 2048.

Transmission of signals in the downlink and/or transmission of signals in the uplink may be organized into radio frames (or system frames, frames) of length $T_f$. $T_f$ is calculated by $(df_{max}N_f/100)*T_s$ and $(df_{max}N_f/100)*T_s$ is equal to 10 ms. One radio frame includes ten subframes. The subframe length $T_{sf}$ is calculated by $df_{max}N_fT_s/1000$ and $df_{max}N_fT_s/1000$ is equal to 1 ms. The number of OFDM symbols per subframe $N^{subframe, u}_{symb}$ is calculated by $N^{slot}_{symb}N^{subframe, u}_{slot}$.

SCS of the OFDM-based waveform may be calculated by subcarrier-spacing configuration u. For example, the SCS may be calculated by $15000*2^u$.

Figure 3:
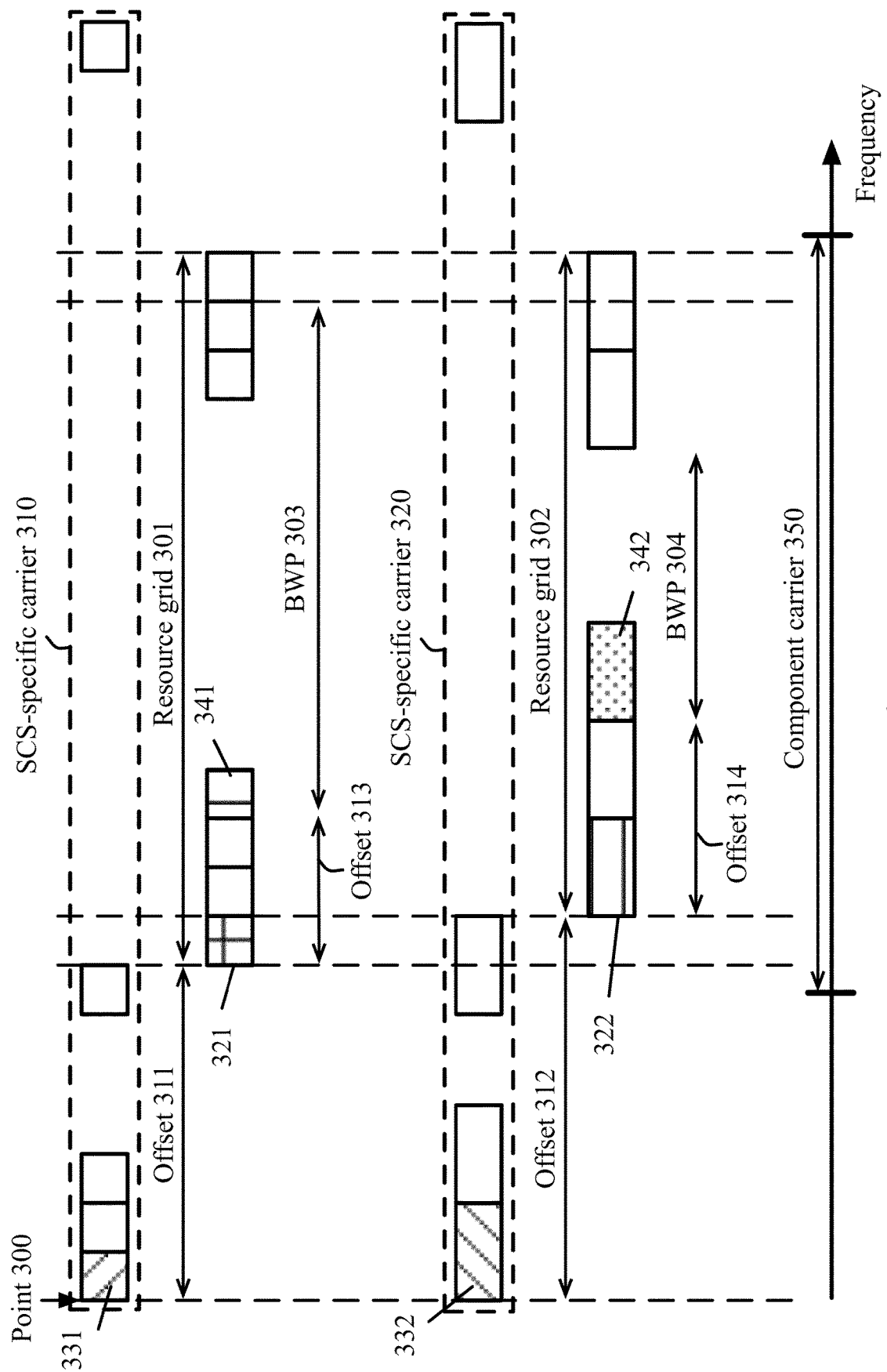
FIG. 3 is a diagram illustrating an example configuration of SCS-specific carriers, according to an example implementation of the present disclosure.

FIG. 3 is a diagram illustrating an example configuration of SCS-specific carriers, according to an example implementation of the present disclosure. The horizontal axis in FIG. 3 represents the frequency domain. FIG. 3 shows a configuration example of two SCS-specific carriers associated with the component carrier 350. In FIG. 3, $u_1=u_2-1$ is assumed.

Point 300 is an identifier for identifying a subcarrier. Point 300 is also referred to as Point A. Common resource blocks (CRBs) for SCS-specific carrier 310 are defined with respect to Point 300. The CRB with index 0 is represented by the block 331. CRBs for SCS-specific carrier 320 are defined with respect to Point 300. The CRB with index 0 is represented by the block 332. The CRB with index 0 is defined as the CRB where a subcarrier in the CRB coincides with the subcarrier identified by Point A.

In FIG. 3, the bandwidth of one CRB in the SCS-specific carrier 310 is a half bandwidth of one CRB in the SCS-specific carrier 320. In other implementations, the bandwidth of one CRB in the SCS-specific carrier 310 may be the same as the bandwidth of one CRB in the SCS-specific carrier 320.

The offset 311 is a Resource Block-level (RB-level) offset from the CRB with index 0 for SCS-specific carrier 310 to the reference point 321 of the resource grid 301. The reference point of the resource grid 301 is the block 321. The offset 312 is an RB-level offset from the CRB with index 0 for SCS-specific carrier 320 to the reference point 322 of the resource grid 302. The reference point of the resource grid 302 is the block 322.

The offset 313 is an RB-level offset from the reference point 321 of the resource grid 301 to the reference point 341 of the Band Width Part (BWP) 303. The reference point of the BWP 303 is the block 341. The offset 314 is an RB-level offset from the reference point 322 of the resource grid 301 to the reference point 342 of the BWP 304. The reference point of the BWP 304 is the block 342.

Figure 4:
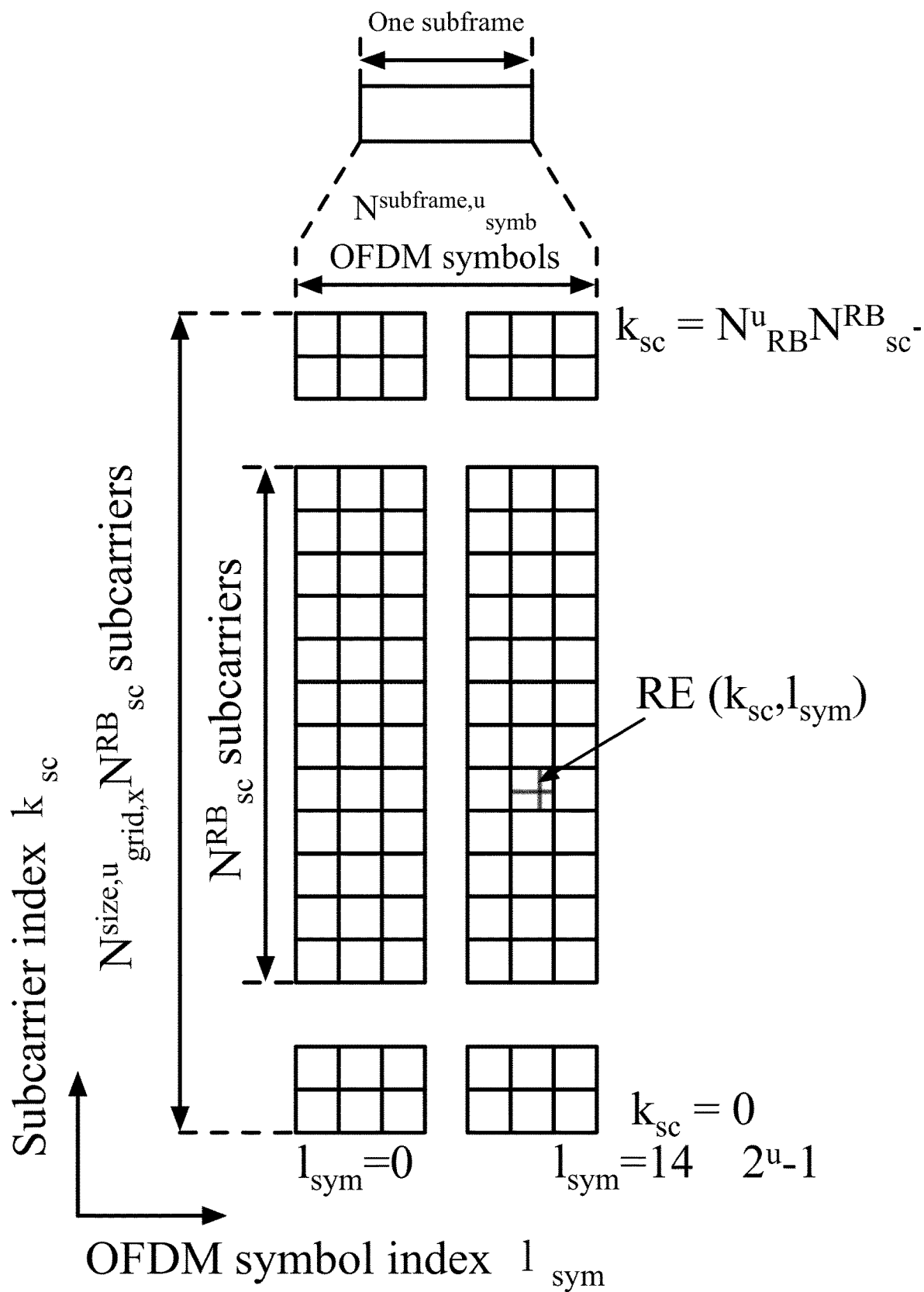
FIG. 4 is a diagrammatic view illustrating an example configuration of a resource grid, according to an example implementation and mode of the present disclosure.

FIG. 4 is a diagrammatic view illustrating an example configuration of a resource grid, according to an example implementation and mode of the present disclosure. The horizontal axis represents OFDM symbol index $l_{sym}$. The vertical axis represents the subcarrier index $k_{sc}$. The resource grid includes $N^{size,u}_{grid1} \times N^{RB}_{sc}$ subcarriers and $N^{subframes,u}_{symb}$ OFDM symbols. A resource specified by the subcarrier index $k_{sc}$ and the OFDM symbol index $l_{sym}$ in a resource grid is also referred to as RE (Resource Element).

A resource block (RB) includes $N^{RB}_{sc}$ consecutive subcarriers. A resource block is a generic name for a CRB, a Physical Resource Block (PRB), and/or a Virtual Resource Block (VRB). In FIG. 4, $N^{RB}_{sc}$ is 12. CRBs are indexed in ascending order starting at CRB with index 0. PRBs are indexed in ascending order starting at its reference point of the BWP. A BWP is defined as a subset of resource blocks included in the resource grid. The BWP includes $N^{size,u}_{BWP,i}$ resource blocks starting from the reference points of the BWP.

An antenna port may be defined such that the channel over which a symbol on the antenna port is conveyed may be inferred from the channel over which another symbol on the same antenna port is conveyed. The channel may correspond to a physical channel. The symbols may correspond to OFDM symbols. The symbols may correspond to resource block units. The symbols may correspond to resource elements.

Two antenna ports are said to be Quasi Co-Located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Carrier aggregation is a framework of communication using multiple aggregated serving cells or using multiple component carriers.

Figure 5:
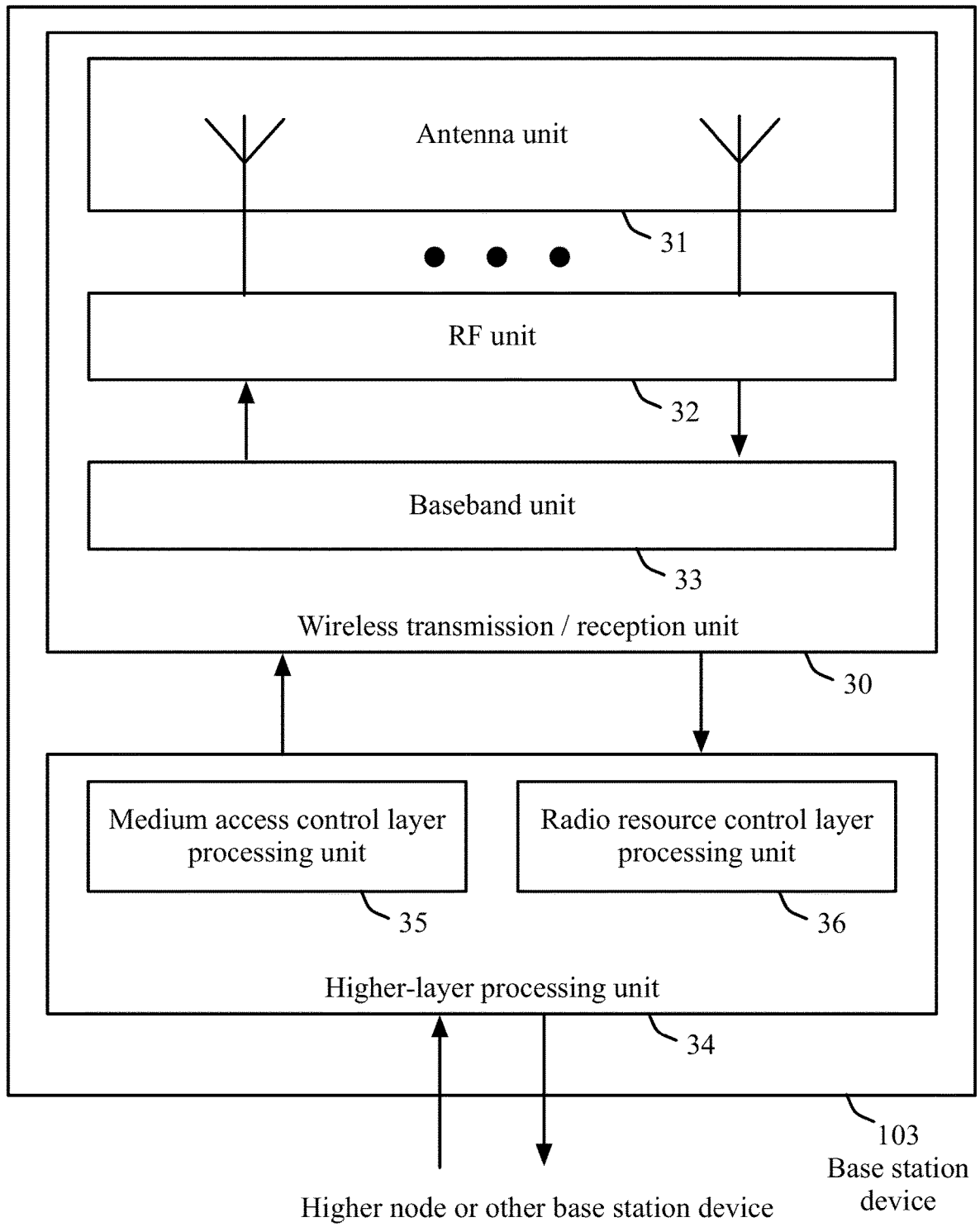
FIG. 5 is a schematic block diagram illustrating a configuration example of a base station device, according to an example implementation of the present disclosure.

FIG. 5 is a schematic block diagram illustrating a configuration example of a base station device 103, according to an example implementation of the present disclosure. As shown in FIG. 5, the base station device 103 may include a part or all of the wireless transmission and reception unit (or physical layer processing unit) 30 and a higher-layer processing unit 34. The wireless transmission and reception unit 30 (also referred to herein as the wireless transmission/reception unit) may include a part or all of an antenna unit 31, a Radio Frequency (RF) unit 32, and a baseband unit 33. The higher-layer processing unit 34 may include a part or all of a Medium Access Control (MAC) layer processing unit 35 and a Radio Resource Control (RRC) layer processing unit 36.

The wireless transmission and reception unit 30 may include a part (or all) of a wireless transmission unit 30a (not shown in the figure) and a wireless reception unit 30b (not shown in the figure). The configuration of the baseband unit 33 in the wireless transmission unit 30a and the configuration of the baseband unit 33 in the wireless reception unit 30b may be the same or different. The configuration of the RF unit 32 in the wireless transmission unit 30a and the configuration of the RF unit 32 in the wireless reception unit 30b may be the same or different. The configuration of the antenna unit 31 in the wireless transmission unit 30a and the configuration of the antenna unit 31 in the wireless reception unit 30b may be the same or different. The wireless transmission and reception unit 30 may include at least one processor (not shown in the figure) and one or more non-transitory computer-readable media (not shown in the figure) that store computer-executable instructions and data.

The higher-layer processing unit 34 may provide downlink data (e.g., transport blocks) to the wireless transmission and reception unit 30 (or the wireless transmission unit 30a). The higher-layer processing unit 34 may perform the processing of a part or all of the MAC layer, the Packet Data Convergence Protocol (PDCP) layer, the Radio Link Control (RLC) layer and the RRC layer. The higher-layer processing unit 34 may also include at least one processor (not shown in the figure) and one or more non-transitory computer-readable media (not shown in the figure) that store computer-executable instructions and data.

The MAC layer processing unit 35 may perform the processing of the MAC layer. The RRC layer processing unit 36 may perform the processing of the RRC layer. The RRC layer processing unit 36 may manage various RRC parameters of the terminal device 101.

The wireless transmission and reception unit 30 (or the wireless transmission unit 30a) may perform processing, such as encoding and modulation. The wireless transmission and reception unit 30 (or the wireless transmission unit 30a) generates a physical signal by encoding and modulating the downlink data. The wireless transmission and reception unit 30 (or the wireless transmission unit 30a) converts the OFDM symbols in the physical signal to a baseband signal by converting them to a time-continuous signal. The wireless transmission and reception unit 30 (or the wireless transmission unit 30a) transmits the baseband signal (or the physical signal) to the terminal device 101 via radio frequency. The wireless transmission and reception unit 30 (or the wireless transmission unit 30a) may arrange the baseband signal (or the physical signal) on a component carrier and transmit the baseband signal (or the physical signal) to the terminal device 101.

The wireless transmission and reception unit 30 (or the wireless reception unit 30b) may perform processing, such as demodulation and decoding. The wireless transmission and reception unit 30 (or the wireless reception unit 30b) separates, demodulates, and decodes the received physical signal, and provides the decoded information to the higher-layer processing unit 34. The wireless transmission and reception unit 30 (or the wireless reception unit 30b) may perform the channel access procedure prior to the transmission of the physical signal.

The RF unit 32 demodulates the radio signal received via the antenna unit 31 into an analog signal, and/or removes the extra frequency components. The RF unit 32 provides the processed analog signal to the baseband unit 33.

The baseband unit 33 converts the analog signal input from the RF unit 32 into a baseband signal. The baseband unit 33 separates a portion which corresponds to the CP from the baseband signal. The baseband unit 33 performs Fast Fourier Transformation (FFT) on the baseband signal from which the CP has been removed. The baseband unit 33 extracts components of the physical signal from the baseband signal. The baseband unit 33 performs Inverse Fast Fourier Transformation (IFFT) on the downlink data to generate time-continuous signal, adds a CP to the generated signal, generates a baseband signal, and converts the baseband signal into an analog signal. The baseband unit 33 provides the analog signal to the RF unit 32.

The RF unit 32 removes the extra frequency components from the analog signal input from the baseband unit 33, up-converts the analog signal to a radio frequency, and transmits it via the antenna unit 31. The RF unit 32 may have the function of controlling transmission power.

From the terminal device 101's perspective, serving cells are cells which provide wireless communication services. Serving cells may be any of a PCell, a PSCell, and an SCell. A PCell represents a serving cell in a Master Cell Group (MCG). A PCell is a serving cell which is used for an initial connection establishment procedure or a connection re-establishment procedure by the terminal device 101.

A PSCell represents a serving cell included in a Secondary Cell Group (SCG). A PSCell is a serving cell in which a random-access procedure is performed by the terminal device 101. An SCell represents a serving cell which is different from a PCell and a PSCell. A serving cell group represents a designation including at least an MCG and an SCG. The serving cell group includes one or more serving cells.

The terminal device 101 configures one or more downlink BWPs per serving cell. The terminal device 101 configures one or more uplink BWPs per serving cell.

The terminal device 101 receives or tries to detect a Physical Downlink Shared Channel (PDSCH), a Physical Downlink Control Channel (PDCCH), and a Channel State Information-Reference Signal (CSI-RS) in the active downlink BWP. The terminal device 101 transmits a Physical Uplink Control Channel (PUCCH) and a Physical Uplink Shared Channel (PUSCH) in the active uplink BWP. The active downlink BWP and the active uplink BWP are also referred to as active BWP.

The terminal device 101 does not receive the PDSCH, PDCCH, and CSI-RS in the downlink BWPs other than the active downlink BWP. The terminal device 101 does not transmit the PUCCH and PUSCH in the uplink BWPs other than the active uplink BWP. BWPs other than the active BWP is referred to as inactive BWPs.

Figure 6:
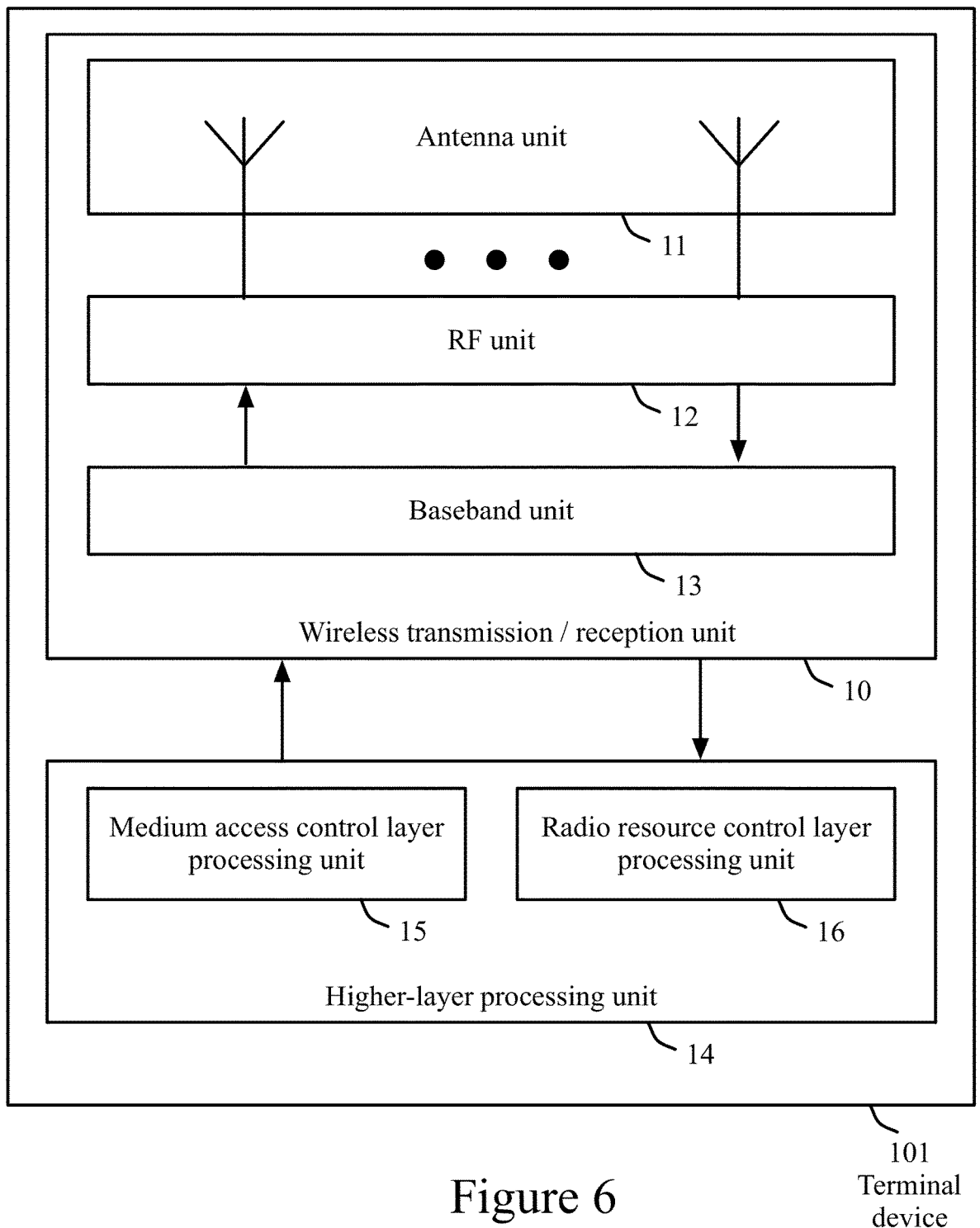
FIG. 6 is a schematic block diagram illustrating a configuration example of a terminal device, according to an example implementation of the present disclosure.

FIG. 6 is a schematic block diagram illustrating a configuration example of a terminal device, according to an example implementation of the present disclosure. As shown in FIG. 6, the terminal device 101 may include a part or all of the wireless transmission and reception unit (e.g., physical layer processing unit) 10 and the higher-layer processing unit 14. The wireless transmission and reception unit 10 (also referred to herein as wireless transmission/reception unit) may include a part or all of the antenna unit 11, the RF unit 12, and the Baseband unit 13. The higher-layer processing unit 14 may include a part or all of the MAC layer processing unit 15 and the RRC layer processing unit 16. The higher-layer processing unit 14 may include at least one processor (not shown in the figure) and one or more non-transitory computer-readable media (not shown in the figure) that store computer-executable instructions and data.

The wireless transmission and reception unit 10 may include a part of or all of the wireless transmission unit 10a (not shown in the figure) and the wireless reception unit 10b (not shown in the figure). The wireless transmission and reception unit 10 may include at least one processor (not shown in the figure) and one or more non-transitory computer-readable media (not shown in the figure) that store computer-executable instructions and data.

The configuration of the baseband unit 13 in the wireless transmission unit 10a and the configuration of the baseband unit 13 included in the wireless reception unit 10b may be the same or different. The configuration of the RF unit 12 in the wireless transmission unit 10a and the RF unit 12 in the wireless reception unit 10b may be the same or different. The configuration of the antenna unit 11 in the wireless transmission unit 10a and the configuration of the antenna unit 11 in the wireless reception unit 10b may be the same or different.

The higher-layer processing unit 14 provides uplink data (transport blocks) to the wireless transmission and reception unit 10 (or the wireless transmission unit 10a). The higher-layer processing unit 14 performs processing of the MAC layer, the PDCP layer, the RLC layer, and/or the RRC layer.

The MAC layer processing unit 15 in the higher-layer processing unit 14 performs processing of the MAC layer. RRC layer processing unit 16 in the higher-layer processing unit 14 performs the process of the RRC layer. RRC layer processing unit 16 manages various RRC parameters of the terminal device 101 based on RRC messages received from the base station device 103.

The wireless transmission and reception unit 10 (or the wireless transmission unit 10a) performs processing, such as encoding and modulation. The wireless transmission and reception unit 10 (or the wireless transmission unit 10a) generates a physical signal by encoding and modulating the uplink data. The wireless transmission and reception unit 10 (or the wireless transmission unit 10a) converts OFDM symbols in the physical signal to a baseband signal by conversion to a time-continuous signal. The wireless transmission and reception unit 10 (or the wireless transmission unit 10a) transmits the baseband signal (or the physical signal) to the base station device 103 via radio frequency. The wireless transmission and reception unit 10 (or the wireless transmission unit 10a) may arrange the baseband signal (or the physical signal) on a BWP (active uplink BWP) and transmit the baseband signal (or the physical signal) to the base station device 103.

The wireless transmission and reception unit 10 (or the wireless reception unit 10b) performs processing, such as demodulation and decoding. The wireless transmission and reception unit 10 (or the wireless reception unit 10b) may receive a physical signal in a BWP (active downlink BWP) of a serving cell. The wireless transmission and reception unit 10 (or the wireless reception unit 10b) separates, demodulates and decodes the received physical signal, and provides the decoded information to the higher-layer processing unit 14. The wireless transmission and reception unit 10 (or the wireless reception unit 10b) may perform the channel access procedure prior to the transmission of the physical signal.

The RF unit 12 demodulates the radio signal received via the antenna unit 11 into an analog signal, and/or removes extra frequency components. The RF unit 12 provides the processed analog signal to the baseband unit 13. The baseband unit 13 converts the analog signal input from RF unit 12 into a baseband signal. The baseband unit 13 separates a portion which corresponds to CP from the baseband signal, performs FFT on the baseband signal from which the CP has been removed. The baseband unit 13 extracts components of the physical signal from the baseband signal.

The baseband unit 13 performs IFFT on the uplink data to generate time-continuous signal, adds a CP to the generated signal, generates a baseband signal, and convert the baseband signal into an analog signal. The baseband unit 13 provides the analog signal to the RF unit 12.

The RF unit 12 removes extra frequency components from the analog signal input from the baseband unit 13, up-converts the analog signal to a radio frequency, and transmits it via the antenna unit 11. RF unit 12 may have a function of controlling transmission power.

A physical signal is a generic term for physical downlink channels, physical downlink signals, physical uplink channels, and physical uplink signals. The physical channel is a generic term for physical downlink channels and physical uplink channels.

A physical uplink channel corresponds to a set of REs that carry one or both of information originating from the higher-layer and the Uplink Control Information (UCI). In the wireless communication system according to one aspect of the present embodiments, a part or all of the PUCCH, PUSCH, and/or a Physical Random Access Channel (PRACH) may be used.

A PUCCH may be used to transmit the UCI. A PUCCH may be sent to deliver (transmit, convey) uplink control information. The UCI may be mapped to the PUCCH. The terminal device 101 may transmit a PUCCH in which the UCI is mapped. The base station device 103 may receive the PUCCH in which the UCI is mapped.

The Channel State Information (CSI) may be deemed as a type of UCI. The CSI is used to convey information related to the propagation path between the terminal device 101 and the base station device 103.

The Hybrid Automatic Repeat request ACKnowledgement (HARQ-ACK) information may also be deemed as a type of UCI. The HARQ-ACK information is used to convey whether the downlink data has been successfully decoded or not.

The Scheduling Request (SR) may also be deemed as a type of UCI. The SR is used to request an uplink resource (a PUSCH or a UL-SCH).

Uplink control information (uplink control information bit, uplink control information sequence, uplink control information type) includes at least part or all of the CSI, SR, and HARQ-ACK.

The CSI may include at least part or all of a channel quality indicator (CQI), a Precoder Matrix Indicator (PMI), and a Rank Indicator (RI). CQI is an indicator related to channel quality (e.g., propagation quality) or physical channel quality, and PMI is an indicator related to a precoder. RI is an indicator related to transmission rank (or the number of transmission layers).

CSI may be provided at least based on receiving one or more physical signals (e.g., one or more CSI-RSs) used at least for channel measurement. The CSI may be selected by a terminal device at least based on receiving one or more physical signals used for channel measurement. Channel measurements may include interference measurements.

A PUSCH may be used to transmit one or both of a transport block and UCI. A PUSCH may be sent to deliver (transmit, convey) one or both of a transport block and uplink control information. The terminal device 101 may transmit a PUSCH in which one or both of a transport block and UCI is mapped. The base station device 103 may receive the PUSCH in which the one or both of the transport block and the UCI is mapped.

A PRACH may be used to transmit a random-access preamble. A PRACH may be sent to deliver (transmit, convey) an index of a random-access preamble, the terminal device 101 may transmit a PRACH. The base station device 103 may receive the PRACH.

For a given PRACH opportunity, 64 random-access preambles are defined. The random-access preamble is specified (determined, given) based on the cyclic shift Cy of the PRACH and the sequence index u for the PRACH.

A physical uplink signal corresponds to a set of REs. A physical uplink signal may not carry information generated in the higher-layer. The terminal device 101 may transmit a physical uplink signal. The base station device 103 may receive the physical uplink signal. In the radio communication system according to one aspect of the present embodiment, a part or all of UL DMRS (UpLink Demodulation Reference Signal), SRS (Sounding Reference Signal), UL PTRS (UpLink Phase Tracking Reference Signal) may be used.

UL DMRS is a generic name of a DMRS for a PUSCH and a DMRS for a PUCCH. A set of antenna ports of a DMRS for a PUSCH may be given based on a set of antenna ports for the PUSCH. For example, a set of DMRS antenna ports for a PUSCH may be the same as a set of antenna ports for the PUSCH.

A PUSCH and a DMRS for the PUSCH is collectively referred to as PUSCH. A set of antenna ports of a DMRS for a PUCCH may be given based on a set of antenna ports for the PUCCH. For example, a set of DMRS antenna ports for a PUCCH may be the same as a set of antenna ports for the PUCCH. A PUCCH and a DMRS for the PUCCH is collectively referred to as PUCCH.

A physical downlink channel corresponds to a set of REs that carry one or both of information originating from the higher-layer and DCI (Downlink Control Information). In the wireless communication system according to one aspect of the present embodiment, a part or all of PBCH (Physical Broadcast Channel), PDCCH (Physical Downlink Control Channel), and PDSCH (Physical Downlink Shared Channel) may be used.

A PBCH may be used to transmit a MIB (Master Information Block). A PBCH may be sent to deliver (transmit, convey) a MIB. The terminal device 101 may receive a PBCH. The base station device 103 may transmit the PBCH.

A PDCCH may be used to transmit DCI. A PDCCH may be sent to deliver (transmit, convey) DCI. The terminal device 101 may receive a PDCCH in which DCI is mapped. The base station device 103 may transmit the PDCCH in which the DCI is mapped.

DCI format includes a set of information fields. Each information field masks a bit sequence for the DCI. Bits masked by an information field is associated with a specific meaning associated with the information field.

Several DCI formats may be used in the wireless communication system according to one aspect of the present embodiment. Several example DCI formats are provided.

DCI format 0_0 is used for scheduling a PUSCH for a cell. The DCI format 0_0 includes a part or all of Information fields 1A to 1E. Information field 1A is a DCI format identification field. Information field 1B is a FDRA (Frequency Domain Resource Assignment) field. Information field 1C is a TDRA (Time Domain Resource Assignment) field. Information field 1D is a frequency-hopping flag field. Information field 1E is an MCS (Modulation-and-Coding-Scheme) field.

A DCI format identification field indicates whether a DCI format including the DCI format identification field is an uplink DCI format or a downlink DCI format. The DCI format identification field included in the DCI format 0_0 indicates that the DCI format 0_0 is an uplink DCI format.

A FDRA field in a DCI format is used to indicate assignment of frequency resources for a physical channel scheduled by the DCI format.

A TDRA field in a DCI format is used to indicate assignment of time resources for a physical channel scheduled by the DCI format.

A frequency-hopping flag field in a DCI format is used to indicate whether frequency-hopping is applied to a physical channel scheduled by the DCI format.

A MCS field in a DCI format is used to indicate one or both of a modulation scheme for a physical channel scheduled by the DCI format and a target code rate for the physical channel. The target code rate is used to determine a TBS (Transport Block Size) for the physical channel.

The DCI format 0_0 may not include fields used for a CSI request. That is, CSI may not be requested by the DCI format 0_0.

The DCI format 0_0 may not include a carrier indicator field. If an uplink DCI format does not include a carrier indicator field, the terminal device 101 determines that an uplink component carrier on which a PUSCH scheduled by the uplink DCI format is mapped is an uplink component carrier in a serving cell which includes a downlink component carrier on which a PDCCH with the uplink DCI format is mapped.

The DCI format 0_0 may not include a BWP indicator field. If a DCI format does not include a BWP indicator field, the terminal device 101 determines that active BWP change has not been triggered by the DCI format.

DCI format 0_1 is used for scheduling of a PUSCH for a cell. The DCI format 0_1 includes a part or all of Information fields 2A to 2H. Information field 2A is a DCI format identification field. Information field 2B is a FDRA field. Information field 2C is a TDRA field. Information field 2D is a frequency-hopping flag field. Information field 2E is an MCS field. Information field 2F is a CSI request field. Information field 2G is a BWP field. Information field 2H is a carrier indicator field.

The DCI format identification field in the DCI format 0_1 indicates that the DCI format 0_1 is an uplink DCI format.

The CSI request field is used to request CSI reporting.

If the DCI format 0_1 includes a BWP field, the BWP field is used to indicate an uplink BWP on which a PUSCH scheduled by the DCI format 0_1 is mapped.

If the DCI format 0_1 includes the carrier indicator field, the carrier indicator field is used to indicate an uplink component carrier on which a PUSCH is mapped.

DCI format 1_0 is used for scheduling of a PDSCH for a cell. The DCI format 1_0 includes a part or all of Information fields 3A to 3F. Information field 3A is a DCI format identification field. Information field 3B is a FDRA field. Information field 3C is a TDRA field. Information field 3D is an MCS field. Information field 3E is a PDSCH-to-HARQ-feedback indicator field. Information field 3F is a PUCCH resource indicator field. The DCI format identification field in the DCI format 1_0 indicates that the DCI format 1_0 is a downlink DCI format.

The PDSCH-to-HARQ-feedback timing indicator field is used to indicate the offset (K1) from a slot in which the last OFDM symbol of a PDSCH scheduled by the DCI format is included to another slot in which the first OFDM symbol of a PUCCH triggered by the DCI format 1_0 is mapped. The PUCCH resource indicator field is used to indicate a PUCCH resource.

The DCI format 1_0 may not include the carrier indicator field. If a downlink DCI format does not include the carrier indicator field, the terminal device 101 determines that a downlink component carrier on which a PDSCH scheduled by the downlink DCI format is mapped is the downlink component carrier on which the PDCCH with the DCI format 1_0 is mapped. The DCI format 1_0 may not include the BWP field.

The DCI format 1_1 is used for scheduling of a PDSCH for a cell. The DCI format 1_1 includes a part or all of Information fields 4A to 4H. Information field 4A is a DCI format identification field. Information field 4B is a FDRA field. The 4C is a TDRA field. Information field 4D is an MCS field. Information field 4E is a PDSCH-to-HARQ-feedback indicator field. Information field 4F is a PUCCH resource indicator field. Information field 4G is a BWP field. Information field 4H is a carrier indicator field. The DCI format identification field in the DCI format 1_1 indicates that the DCI format 1_1 is a downlink DCI format.

A PDSCH may be used to transmit a transport block. A PDSCH may be sent to deliver (transmit, convey) a transport block. The base station device 103 may transmit a PDSCH. The terminal device 101 may receive the PDSCH.

A physical downlink signal corresponds to a set of REs. A physical downlink signal may not carry the information generated in the higher-layer. The base station 103 transmits a physical downlink signal. The terminal device 101 receives the physical downlink signal. In the wireless communication system according to one aspect of the present embodiment, at least a part or all of an SS (Synchronization signal), DL DMRS (DownLink DeModulation Reference Signal), CSI-RS (Channel State Information-Reference Signal), and DL PTRS (DownLink Phase Tracking Reference Signal) may be used.

A synchronization signal is used to synchronize in the frequency domain and time domain for downlink. The synchronization signal is a generic name of PSS (Primary Synchronization Signal) and SSS (Secondary Synchronization Signal).

Figure 7:
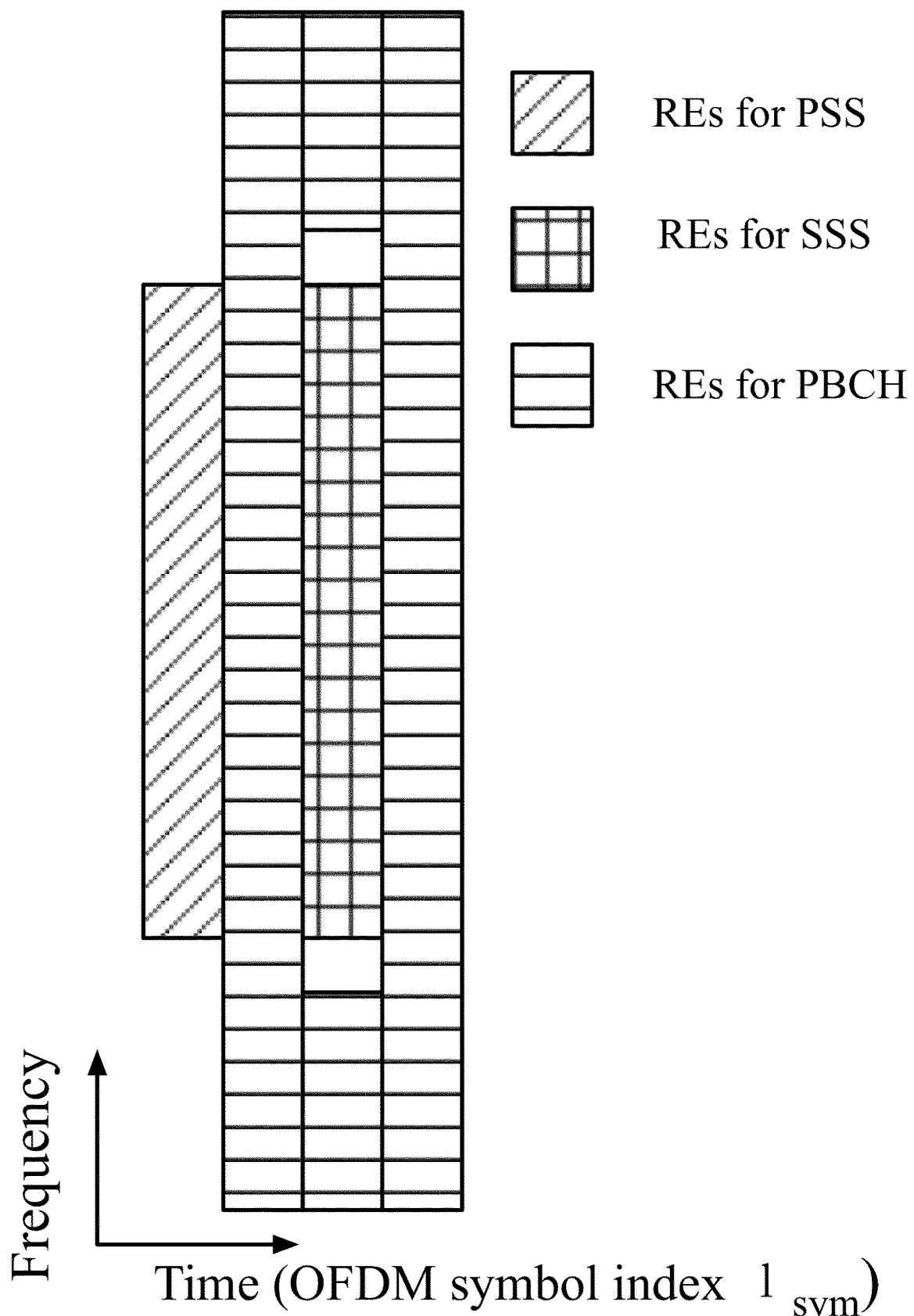
FIG. 7 is a diagram illustrating an example configuration of a synchronization signal/physical broadcast channel (SS/PBCH) block including a primary synchronization signal (PSS) and a secondary synchronization signal (SSS), according to an example implementation of the present disclosure.

FIG. 7 is a diagram illustrating an example configuration of a synchronization signal/physical broadcast channel (SS/PBCH) block including a primary synchronization signal (PSS) and a secondary synchronization signal (SSS), according to an example implementation of the present disclosure. In FIG. 7, the horizontal axis represents the OFDM symbol index $l_{sym}$, and the vertical axis represents the frequency domain. The shaded blocks represent a set of REs for the PSS. The block of grid lines represents a set of REs for the SSS. Also, the blocks in the horizontal line represent a set of REs for the PBCH and a set of REs for a DMRS for the PBCH.

The SS/PBCH block in FIG. 7 includes a PSS, an SSS, and a PBCH. The SS/PBCH block includes 4 consecutive OFDM symbols and 240 subcarriers. The PSS is allocated to the 57th to 183rd subcarriers in the first OFDM symbol. The SSS is allocated to the 57th to 183rd subcarriers in the third OFDM symbol. The first to 56th subcarriers of the first OFDM symbol may be set to zero. The 184th to 240th subcarriers of the first OFDM symbol may be set to zero. The 49th to 56th subcarriers of the third OFDM symbol may be set to zero. The 184th to 192nd subcarriers of the third OFDM symbol may be set to zero. In the first to 240th subcarriers of the second OFDM symbol, the PBCH is allocated to subcarriers in which the DMRS for the PBCH is not allocated. In the first to 48th subcarriers of the third OFDM symbol, the PBCH is allocated to subcarriers in which the DMRS for the PBCH is not allocated. In the 193rd to 240th subcarriers of the third OFDM symbol, the PBCH is allocated to subcarriers in which the DMRS for the PBCH is not allocated. In the first to 240th subcarriers of the 4th OFDM symbol, the PBCH is allocated to subcarriers in which the DMRS for the PBCH is not allocated.

The antenna ports of the PSS, the SSS, the PBCH, and the DMRS for the PBCH in an SS/PBCH block is identical. DL DMRS is a generic name of a DMRS for a PBCH, a DMRS for a PDSCH and a DMRS for a PDCCH.

A set of antenna ports of a DMRS for a PDSCH may be given based on a set of antenna ports for the PDSCH. For example, a set of DMRS antenna ports for a PDSCH may be the same as a set of antenna ports for the PDSCH.

A PDSCH and a DMRS for the PDSCH is collectively referred to as PDSCH. A set of antenna ports of a DMRS for a PDCCH may be given based on a set of antenna ports for the PDCCH. For example, a set of DMRS antenna ports for a PDCCH may be the same as a set of antenna ports for the PDCCH. A PDCCH and a DMRS for the PDCCH is collectively referred to as PDCCH.

A BCH (Broadcast CHannel), a UL-SCH (Uplink-Shared CHannel) and a DL-SCH (Downlink-Shared CHannel) are transport channels. A channel used in the MAC layer is called a transport channel. A unit of transport channel used in the MAC layer is also called transport block (TB) or MAC PDU (Protocol Data Unit). In the MAC layer, control of HARQ (Hybrid Automatic Repeat request) is performed for each transport block. The transport block is a unit of data delivered by the MAC layer to the physical layer. In the physical layer, transport blocks are mapped to codewords and modulation processing is performed for each codeword.

One UL-SCH and one DL-SCH may be provided for each serving cell. BCH may be given to PCell. BCH may not be given to PSCell and SCell.

A BCCH (Broadcast Control CHannel), a CCCH (Common Control CHannel), and a DCCH (Dedicated Control CHannel) are logical channels. The BCCH is a channel of the RRC layer used to deliver MIB or system information. The CCCH may be used to transmit a common RRC message in multiple terminal devices. The DCCH may be used to transmit a dedicated RRC message to a terminal device.

The BCCH in the logical channel may be mapped to the BCH or the DL-SCH in the transport channel. The CCCH in the logical channel may be mapped to the DL-SCH or the UL-SCH in the transport channel. The DCCH in the logical channel may be mapped to the DL-SCH or the UL-SCH in the transport channel.

The UL-SCH in the transport channel may be mapped to a PUSCH in the physical channel. The DL-SCH in the transport channel may be mapped to a PDSCH in the physical channel. The BCH in the transport channel may be mapped to a PBCH in the physical channel.

A higher-layer parameter is a parameter in an RRC message or a MAC CE (Control Element). A higher-layer parameter may be a cell-specific parameter or a UE-specific parameter. A cell-specific parameter is a parameter including a common configuration in a cell. A UE-specific parameter is a parameter including a configuration that may be configured differently for each UE.

The base station device 103 may indicate change of cell-specific parameters by reconfiguration with random-access. The base station device 103 may indicate change of UE-specific parameters by reconfiguration with or without random-access.

Figure 8:
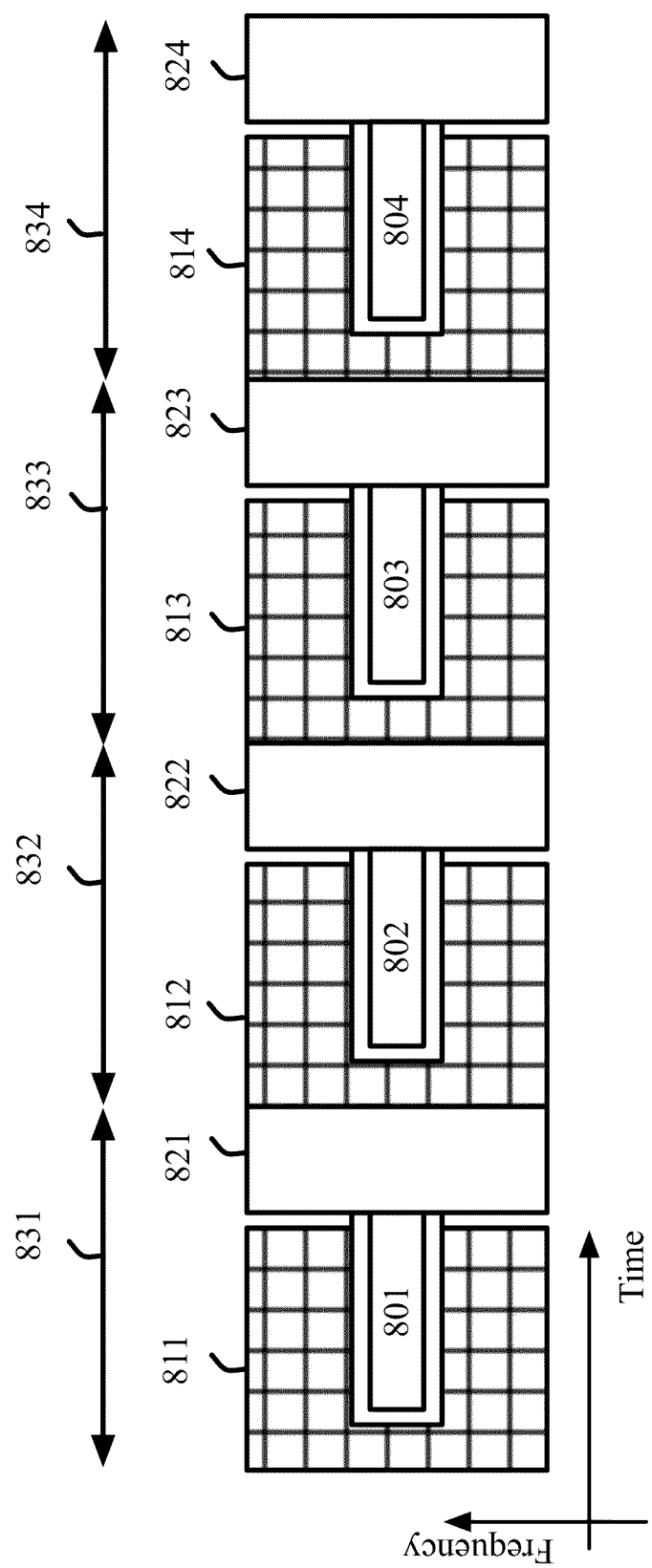
FIG. 8 is a time-frequency diagram illustrating an example resource partitioning in a serving cell, according to an example implementation of the present disclosure.

FIG. 8 is a time-frequency diagram illustrating an example resource partitioning in a serving cell, according to an example implementation of the present disclosure. The horizontal axis represents the time domain. The vertical axis represents the frequency domain. The regions 801, 802, 803, and 804 represent the time-frequency resources for a UL subband. The regions 811, 812, 813, and 814 with grid lines represent DL regions. The regions 821, 822, 823, and 824 represent UL regions. The lines 831, 832, 833, and 834 represent periods of the TDD pattern. Each region represents a resource for each SS/PBCH block with a different index. Time domain guard periods are placed on a switching location from DL to UL. Frequency domain guard bands are placed on a boundary of DL and UL.

TDD pattern is a pattern including a part of all the DL region, flexible region, and UL region. In FIG. 8, the TDD pattern includes the DL region and the UL region. The time domain guard period between the DL region and UL region may be as part of the DL region, as part of the UL region, or flexible region. The TDD pattern is configured based on one or more RRC parameters provided by the RRC layer.

The UL subband is configured in one or both of the DL region and the time domain guard period. The time domain resource of the UL subband is configured by one or more RRC parameters provided by the RRC layer.

The time domain resource of the UL subband may be configured by one or more first RRC parameters used to indicate a periodicity of the UL subband, one or more second RRC parameters used to indicate the starting slot of the UL subband in each period, and one or more third RRC parameters used to indicate the length of the UL subband in each period in number of slots. For example, in a case that the periodicity is 20 slots, the starting slot is the $3^{rd}$ slot, and the length is 11 slots, the terminal device 101 determines that the UL subband with length of 11 slots starting at the $3^{rd}$ slot is placed in each periodicity.

One or more first RRC parameters used to indicate the periodicity may be one or more RRC parameters different from the one or more RRC parameters used to indicate the periodicity of the TDD pattern. For example, the one or more RRC parameters used to indicate the periodicity of the TDD pattern may be reused to indicate the periodicity of the UL subband. For example, the terminal device 101 may assume the periodicity of the UL subband is the same as the periodicity of the TDD pattern.

One or more fourth RRC parameters may be used to indicate the starting OFDM symbol of the UL subband in the starting slot. For example, one or more fifth RRC parameters may be used to indicate the length of the UL subband in number of symbols. For example, the frequency domain resource of the UL subband may be configured by one or more first RRC parameters used to indicate the starting RB of the UL subband and one or more second RRC parameters used to indicate the length of the UL subband in number of RBs.

The UL subband may be configured in an SCS-specific carrier. Therefore, in this case, the RRC parameters used to indicate resources of the UL subband may be provided per SCS-specific carrier. The UL subband may be configured in a BWP. Therefore, in this case, the RRC parameters used to indicate resources of the UL subband may be provided per BWP.

Using the UL subband, the base station device 103 may perform simultaneous transmission and reception at a time. For example, in a time occasion with UL subband 801, the base station device 103 performs transmission of physical downlink channels in the region 811 and reception of physical uplink channels in the region 801 at a time. The time occasion where the UL subband is mapped is referred to as a SubBand Full Duplex (SBFD) region.

Various physical layer configurations may be independently provided for the SBFD region and non-SBFD region. For example, the base station device 103 may use different QCL properties for the SBFD region and the non-SBFD region. The base station device 103 may use different settings for the components of the RF unit 32. For example, the components may include analog filters, amplifiers, or clocks. The terminal device 101 may obtain information related to the various physical layer configurations from the base station device 103.

Figure 9:
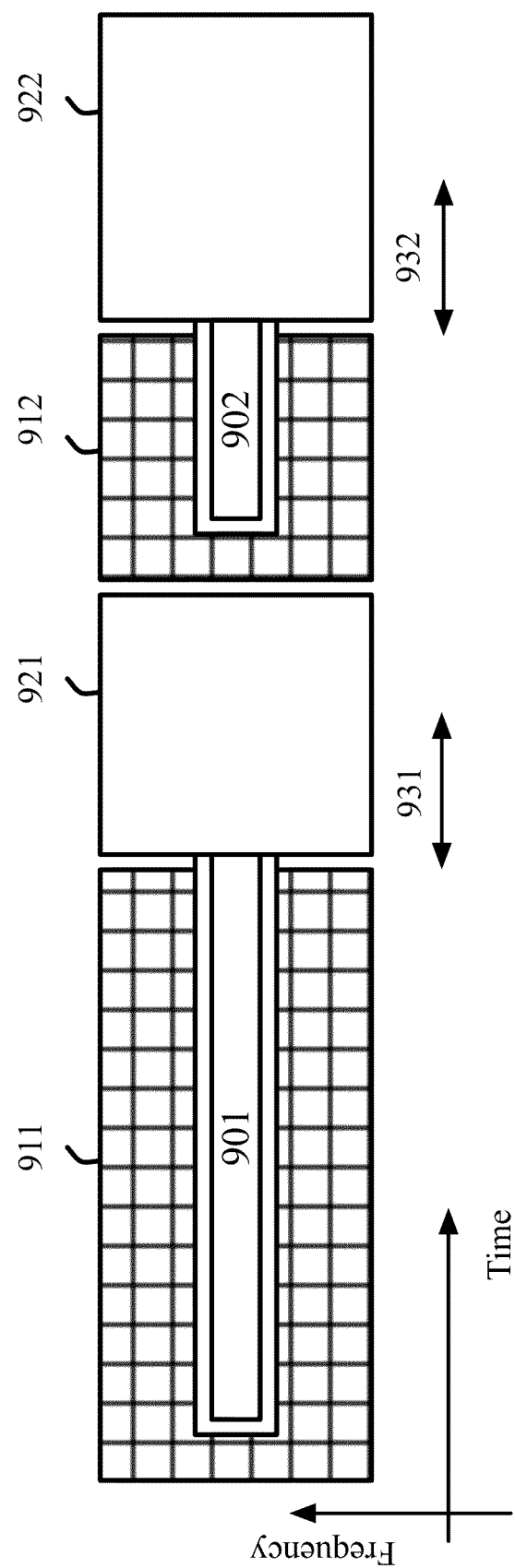
FIG. 9 is a time-frequency diagram illustrating an example resource partitioning in a serving cell, according to an implementation of the present disclosure.

FIG. 9 is a time-frequency diagram illustrating an example resource partitioning in a serving cell, according to an implementation of the present disclosure. The horizontal axis represents the time domain. The vertical axis represents the frequency domain. The regions 901 and 902 represent the time-frequency resources for a UL subband. The regions 911 and 912 with grid lines represent the DL regions. The regions 921 and 922 represent the UL regions.

In some implementations, when the terminal device (or UE) 101 changes its configuration in an aperiodic manner, the base station device 103 may not know at which time the terminal device 101 changed its configuration. On the other hand, when the terminal device 101 switches its configuration, a gap duration may exist where the terminal device 101 may not be able to transmit and receive physical signals. For example, when the terminal device 101 is changing its configuration at the end of duration 911 from the SBFD configuration to a normal configuration, the terminal device 101 may process the change in the duration 931 of FIG. 9. Also, when the UE is changing its configuration at the end of duration 912 from the SBFD configuration to a normal configuration, the terminal device 101 may process the change in duration 932.

In another example, in duration 931 or 932, the terminal device 101 (e.g., the wireless transmission and reception unit 10) may transmit and/or receive physical channels. Still, the terminal device 101 may not have enough room to process other operations/calculations (e.g., processing the CSI for a CSI report). Therefore, even if the terminal device 101 transmits a CSI report during the duration 931 or 932, the terminal device 101 may not be able to calculate (or update) new CSI for the CSI report.

As described above, there may be a duration in which the terminal device 101 (e.g., the wireless transmission and reception unit 10) may not be able to transmit a CSI report (and/or perform CSI processing to update the CSI report) even if the terminal device 101 is configured/triggered to transmit the CSI report.

It may be beneficial for the base station device 103 and the terminal device 101 to share a common understanding as to where these durations are. For example, the base station device 103 may send information related to one or more durations where the terminal device 101 may be allowed to stop (or forgo) processing the CSI. Stopping (or forgoing) the processing of the CSI may include one of (i) the terminal device 101 stops/cancels/omits/drops the transmission of a physical channel to send the CSI, or (ii) the terminal device 101 stops/cancels/drops updating the CSI for the CSI report and sends a physical channel including the previous CSI or the first information.

The first information may include (or represent or indicate) a specific code point of a first information field. The first information field may be a Channel Quality Indicator (CQI) field in a CSI report. The CQI field may include a specific code point (e.g., the code point '0' in decimal number (or code point '0000' in binary number in case of 4 bits CQI field)). In the CQI field, the code point '0' in decimal number may be used to indicate that the channel quality of the link from the base station device 103 to the terminal device 101 is below a (desired) threshold. In the CQI field, the code point '0' in decimal number may be used to indicate that the channel quality of the link from the base station device 103 to the terminal device 101 is not above any threshold for the CQI.

Each code point other than '0' in decimal number may be used to indicate the channel quality of the link from the base station device 103 to the terminal device 101 is above a specific threshold. For example, a first code point other than '0' in decimal number may be used to indicate the channel quality of the link from the base station device 103 to the terminal device 101 is above a threshold which is associated with the first code point. For example, a second code point other than '0' in decimal number may be used to indicate the channel quality of the link from the base station device 103 to the terminal device 101 is above a threshold which is associated with the second code point.

The channel quality may be measured in terms of block error rate. For example, the channel quality may be measured in terms of block error rate of a transport block. The measurement of the channel quality may be done via the CSI-RS received by the terminal device 101. The terminal device 101 may obtain whether predicted block error rate of a transport block with a specific threshold (or code rate) is lower than a target block error rate or not. For example, the target code rate may be 0.1 or 0.001 or 0.00001 or other values. The target code rate may be configured by the base station device 103. The target code rate may be provided by the higher layers (e.g., higher-layer processing unit 14, as shown in FIG. 6).

The first information field may be an RI field in a CSI report. The RI field may include a specific code point. The specific code point may be a code point which indicates the maximum transmission rank configured for the CSI report. The specific code point may be the largest code point in the code points which may be represented by the RI field. The largest code point in the 2-bits RI field may be '3' in decimal number. The specific code point may be a code point which is reserved (or not used) for the CSI report.

The first information field may be a PMI field. The PMI field may include a specific code point. For example, the specific code point may be a code point which is reserved (or not used) for the CSI report.

The first information may include (or represent or indicate) a combination of a part (or all) of (i) a first specific code point of a first information field, (ii) a second specific code point of a second information field, and/or (iii) a third specific code point of a third information field.

For example, the first information may include (or represent or indicate) a combination of a first specific code point of a CQI field and a second specific code point of an RI field. The first information may include (or represent or indicate) a combination of the code point '0' in decimal number of a CQI field and a specific code point which indicates the maximum transmission rank configured for the CSI report of an RI field. The first information may include (or represent or indicate) a combination of the code point '0' in decimal number of a CQI field and a specific code point which is reserved (or not used) for the CSI report. The information related to the possible durations (during which the CSI processing is stopped, or a CSI report is not sent out) may be used to determine the possible durations.

Figure 10:
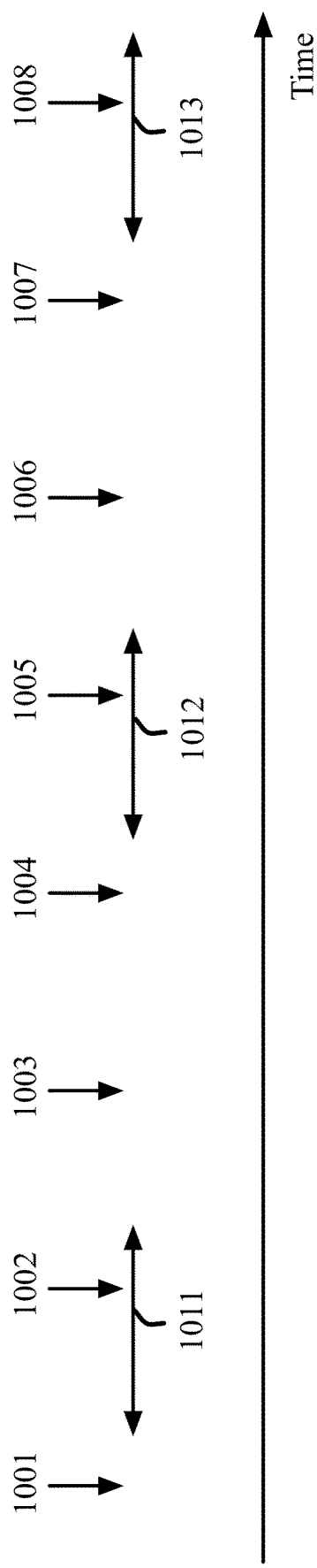
FIG. 10 is a timing diagram illustrating an example configuration of the possible durations where a UE may be allowed to stop processing the CSI, according to an implementation of the present disclosure.

FIG. 10 is a timing diagram illustrating an example configuration of the possible durations where a UE may be allowed to stop processing the CSI, according to an implementation of the present disclosure. The horizontal axis represents the time domain. Arrows 1001 to 1008 represent the CSI reporting occasions. The durations 1011, 1012, and 1013 represent the possible durations during which the terminal device 101 may be allowed to stop (or forgo) processing the CSI.

With reference to FIG. 10, the terminal device 101 (e.g., the wireless transmission and reception unit 10 of the terminal device 101) may not stop (or may continue) the processing of the CSI when the occasion of a CSI report is not within any of the durations 1011-1013. The terminal device 101 may stop processing the CSI when the occasion of a CSI report is within any of the durations 1011-1013, where the wireless transmission and reception unit 10 may be allowed to stop processing the CSI. The terminal device 101 may not stop processing the CSI at occasions 1001, 1003, 1004, 1006, and 1007. That is, the terminal device 101 may not stop processing the CSI when the occasion of a CSI report is not within any of the durations 1011-1013.

In some implementations, the terminal device 101 (e.g., the wireless transmission and reception unit 10) may not stop processing the CSI when the occasion of a CSI report is not within any of the durations 1011-1013, even if an indication to stop processing the CSI has been received, for example, from the higher-layer processing unit 16 of the terminal device 101. In some other implementations, the wireless transmission and reception unit 10 may stop processing the CSI when the occasion of a CSI report is within one of the durations 1011-1013 and an indication to stop processing the CSI has been received from the higher-layer processing unit 16. In yet some other implementations, the wireless transmission and reception unit 10 may not stop processing the CSI when the occasion of a CSI report is within a possible duration (e.g., one of the durations 1011-1013) if an indication to stop processing CSI has not been received from the higher-layer processing unit 16.

Figure 11A:
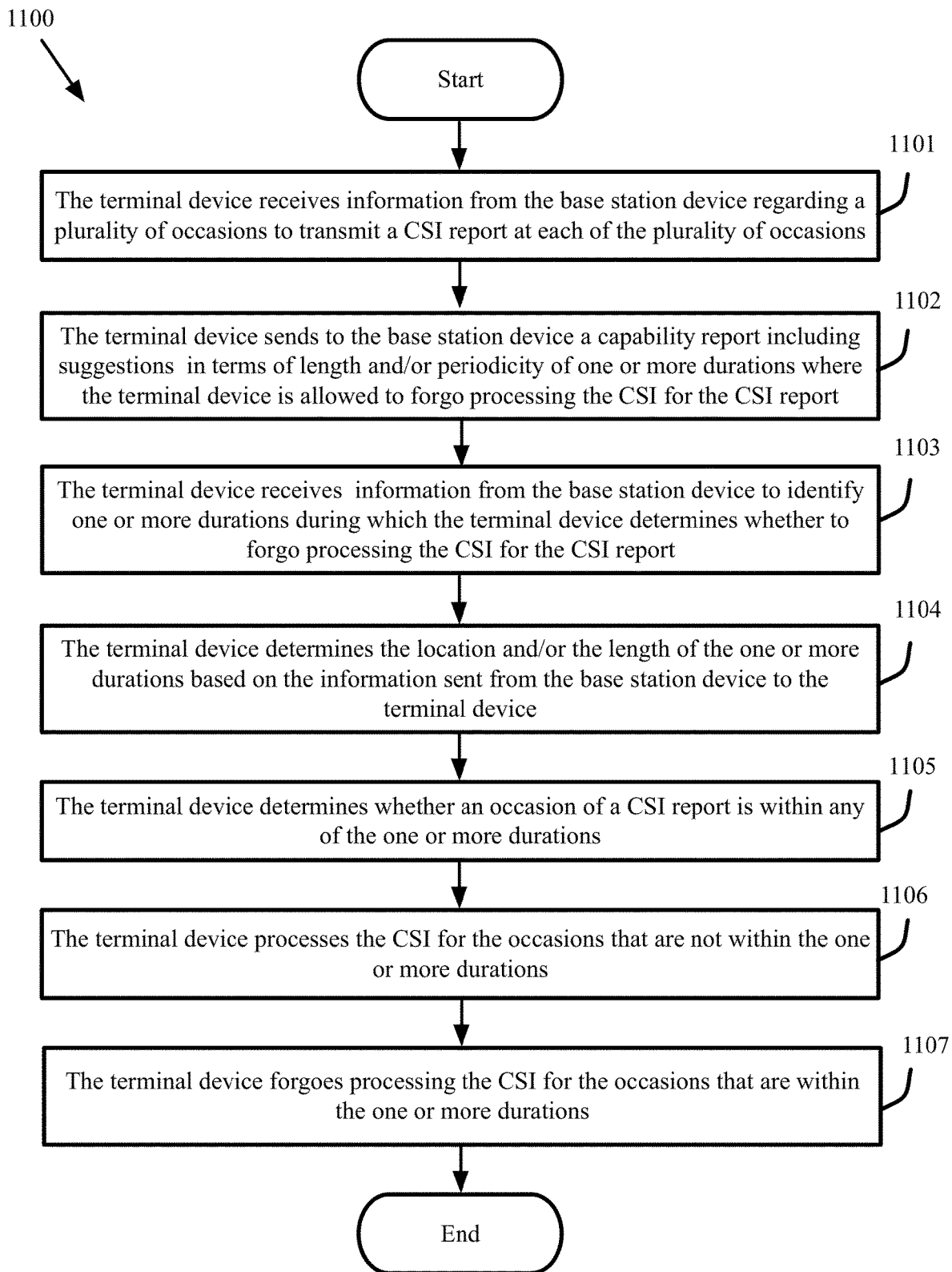
FIG. 11A is a flowchart illustrating an example method/process performed by a terminal device to forgo the CSI processing at one or more occasions (e.g., during one or more durations) based on the information received from a base station, according to an example implementation of the present disclosure.

FIG. 11A is a flowchart illustrating an example method/process 1120 performed by a terminal device 101 to forgo the CSI processing at one or more occasions (e.g., during one or more durations) based on the information received from a base station, according to an example implementation of the present disclosure.

With reference to FIG. 11A, the process 1100 may be performed by at least one processor of the terminal device 101 of FIGS. 1 and 6. At block 1101, the terminal device 101 may receive information from the base station device 103 regarding one or more occasions to transmit a CSI report at each of the one or more occasions. For example, the terminal device 101 may receive information regarding the occasions 1001-1008, as described above with reference to FIG. 10. The terminal device 101 may receive the information from the base station device 103 through control signaling, such as an RRC message, a MAC CE, or via DCI.

At block 1102, the terminal device 101 may send (or transmit) a capability report to the base station device 103. The terminal device 101 may transmit the capability report to the base station device 103 through RRC signaling, or a MAC CE, or via UCI. The capability report may include suggestions in terms of length and/or periodicity of one or more durations where the terminal device 101 is allowed to forgo processing the CSI for the CSI report. For example, the suggestion on the possible durations in terms of length may be provided in terms of OFDM symbols, slots, subframes, or radio frames. The suggestion on the possible durations in terms of periodicity may be provided in terms of OFDM symbols, slots, subframes, or radio frames. When the suggestions on the possible durations in terms of length and/or periodicity are not sent from the terminal device 101 to the base station device 103, block 1102 may be omitted.

At block 1103, the terminal device 101 may receive information from the base station device 103 to identify one or more durations during which the terminal device 101 may determine whether to forgo processing the CSI for the CSI report. In some implementations, the terminal device 101 may receive the information from the base station device 103 through control signaling, such as an RRC message, a MAC CE, or via DCI. In some such implementation, the terminal device 101 may receive both the information regarding the one or more durations and the information regarding the occasions to transmit the CSI report from the base station device 103 through the same RRC message, or the same MAC CE, or via the same DCI.

The base station device 103 may send information to the terminal device 101 to identify one or more possible durations. The information may include information indicating the length of each possible duration. The information may include information indicating periodicity of the possible durations. When the information related to the possible durations is not sent from the base station device 103 to the terminal device 101, block 1103 may be omitted.

At block 1104, the terminal device 101 may determine the location and/or the length of each of the one or more possible durations based on the information sent from the base station 103 to the terminal device 101. When the information related to the possible duration has not been sent from the base station device 103 to the terminal device 101, the terminal device 101 may identify the one or more possible durations independently (e.g., based on information that is stored in a memory device or a storage device of the terminal device 101).

At block 1105, the terminal device 101 may determine whether an occasion of a CSI report is within any of the one or more possible durations. Alternatively, or additionally, the terminal device 101 may identify whether the wireless transmission and reception unit 10 has received an indication to stop processing the CSI.

At block 1106, the terminal device 101 may process the CSI for the occasions that are not within the one or more durations where the terminal device is allowed to forgo processing the CSI.

At block 1107, the terminal device 101 may forgo processing the CSI for the occasions that are within the one or more durations where the terminal device 101 is allowed to forgo processing the CSI. At block 1107, the wireless transmission and reception unit 10 may stop processing the CSI when the occasion of the CSI report is within a possible duration among the one or more durations where the terminal device is allowed to forgo processing the CSI. When the wireless transmission and reception unit 10 determines that the occasion of a CSI report is within a possible duration among the one or more possible durations, the wireless transmission and reception unit 10 may stop processing the CSI. When the wireless transmission and reception unit 10 determines that the occasion of a CSI report is not within any of the one or more possible durations, the wireless transmission and reception unit 10 may not stop (or may continue) processing CSI.

Alternatively, at block 1107, the wireless transmission and reception unit 10 may stop processing CSI when the occasion of the CSI report is within a possible duration among the one or more possible durations and also an indication to stop processing the CSI is received from the higher-layer processing unit 16. When the wireless transmission and reception unit 10 determines that the occasion of a CSI report is not within any of the one or more possible durations, the wireless transmission and reception unit 10 may not stop processing CSI regardless of whether or not an indication to stop processing the CSI is received from the higher-layer processing unit 16.

In some implementations, when the wireless transmission and reception unit 10 determines that the occasion of a CSI report is within a possible duration among the one or more possible durations and an indication to stop processing the CSI is received from the higher-layer processing unit 16, the wireless transmission and reception unit 16 may stop processing the CSI. In some other implementations, when the wireless transmission and reception unit 10 determines that the occasion of a CSI report is within a possible duration among the one or more possible durations and an indication to stop processing CSI is not received from the higher-layer processing unit 16, the wireless transmission and reception unit 16 may not stop processing the CSI. The wireless transmission and reception unit 10 may send the information about processing the CSI to the base station device 103 when the terminal device 101 decides to stop processing the CSI for a CSI report.

Figure 11B:
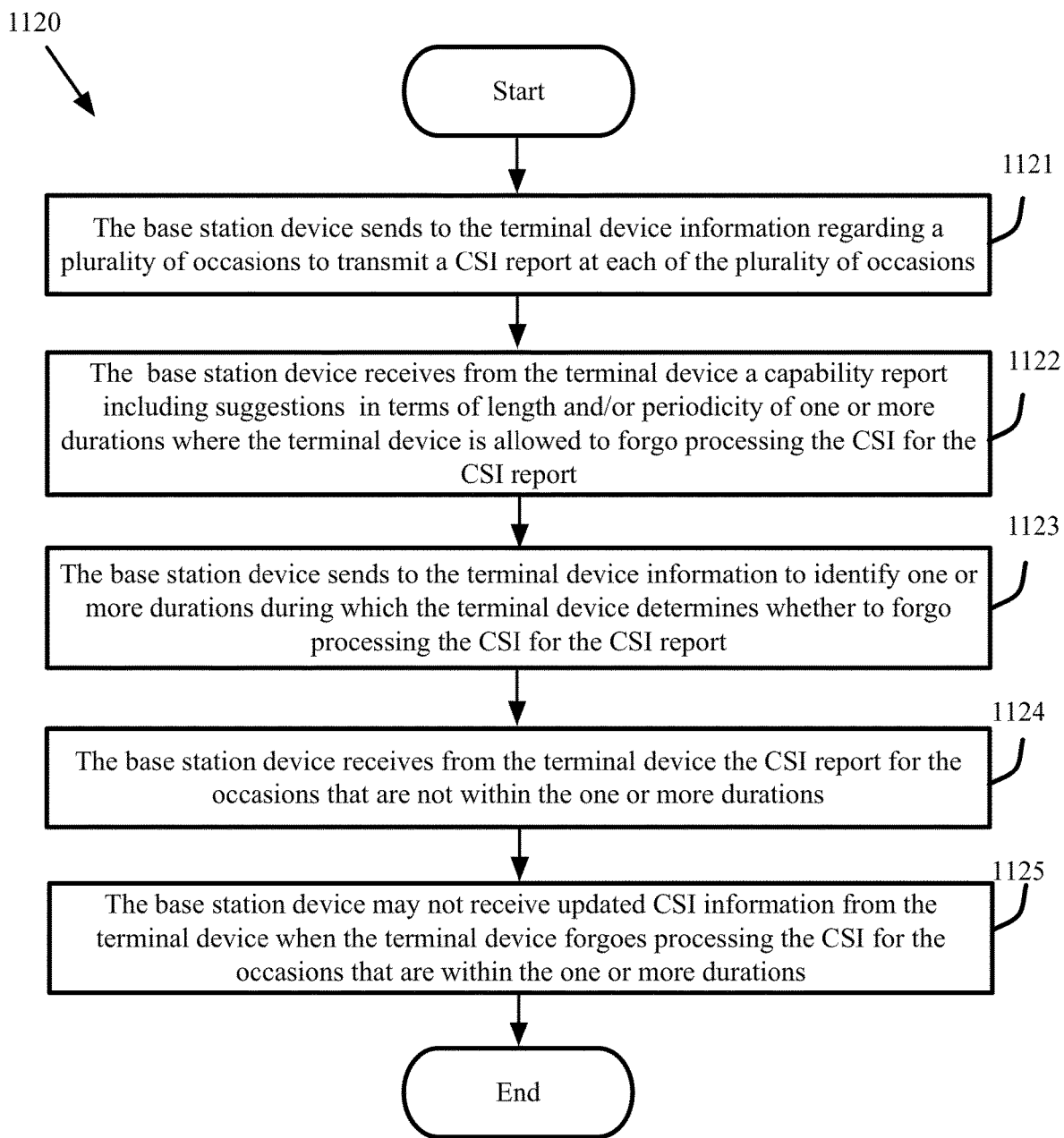
FIG. 11B is a flowchart illustrating an example method/process performed by a base station for processing the CSI at one or more occasions (e.g., during one or more durations) based on the information provided by the base station, according to an example implementation of the present disclosure.

FIG. 11B is a flowchart illustrating an example method/process performed by a base station for processing the CSI at one or more occasions (e.g., during one or more durations) based on the information provided by the base station, according to an example implementation of the present disclosure.

With reference to FIG. 11B, the process 1120 may be performed by at least one processor of the base station device 103 of FIGS. 1 and 5. At block 1121, the base station device 103 may send information regarding one or more occasions to transmit a CSI report at each of the one or more occasions to the terminal device 101. For example, the base station device 103 may send information regarding the occasions 1001-1008, as described above with reference to FIG. 10. In some implementations, the information may be sent in the same manner as described in action 1101 of FIG. 11A.

At block 1122, the base station device 103 may receive a capability report from the terminal device 101. The capability report may include suggestions in terms of length and/or periodicity of one or more durations where the terminal device is allowed to forgo processing the CSI for the CSI report. The suggestion on the possible duration in terms of length may be provided in terms of OFDM symbols, slots, subframes, or radio frames. The suggestion on the possible duration in terms of periodicity may be provided in terms of OFDM symbols, slots, subframes, or radio frames. When the suggestions on the possible duration in terms of length and/or periodicity are not sent from the terminal device 101 to the base station device 103, block 1122 may be omitted. In some implementations, the capability information may be received in the same manner as described in action 1102 of FIG. 11A.

At block 1123, the base station device 103 may send to the terminal device 101 information to identify one or more durations during which the terminal device 101 determines whether to forgo processing the CSI for the CSI report. The base station device 103 may send information to the terminal device 101 to identify one or more possible durations. The information may include information indicating the length of each possible duration. The information may include information indicating periodicity of the possible duration. When the information related to the possible duration is not sent from the base station device 103 to the terminal device 101, block 1123 may be omitted. In some implementations, the information may be sent in the same manner as described in action 1103 of FIG. 11A.

At block 1124, the base station device may receive from the terminal device the CSI report for the occasions that are not within the one or more durations.

At block 1125, the base station device may not receive updated CSI information (e.g., an updated CSI report) from the terminal device when the terminal device forgoes processing the CSI for the occasions that are within the one or more durations.

Figure 12A:
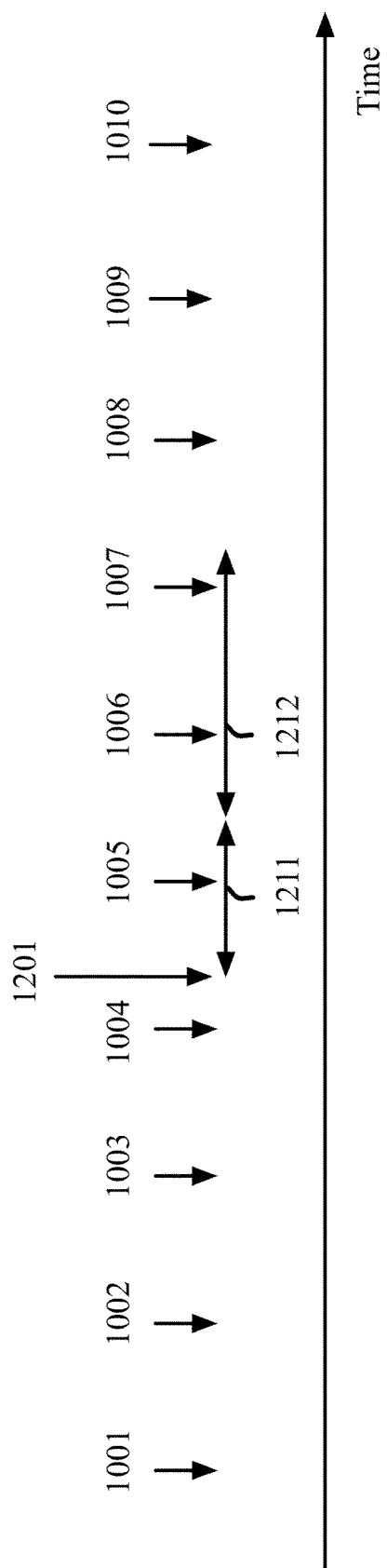
FIGS. 12A and 12B are timing diagrams illustrating examples of a procedure for sending a message that includes information about CSI processing from a UE to a base station device, according to an example implementation of the present disclosure.
Figure 12B:
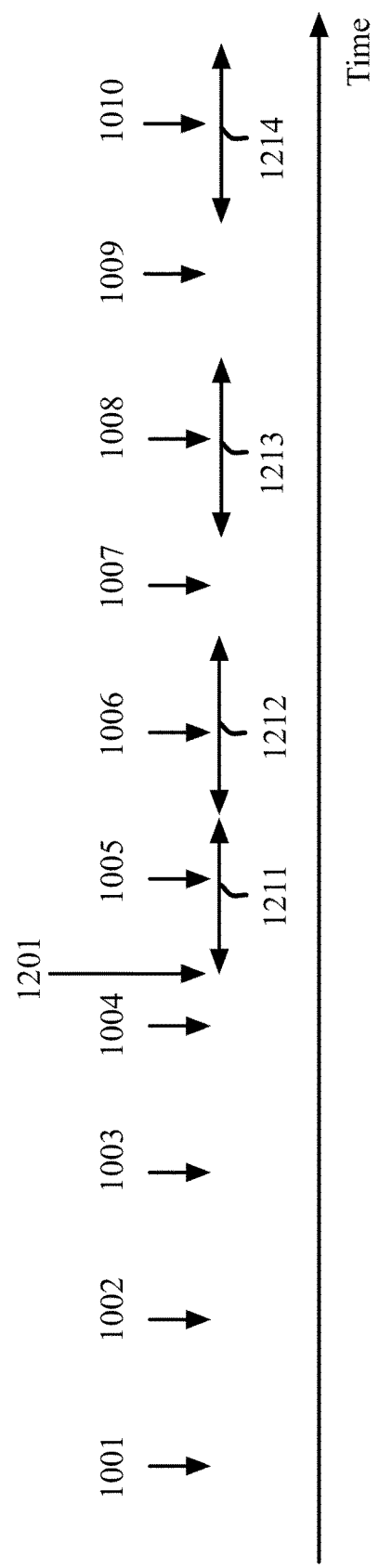

FIGS. 12A and 12B are examples of the procedure for sending a message that includes information about processing CSI from the wireless transmission and reception unit 10 of the terminal device 101 to the base station device 103, according to an example implementation of the present disclosure. With reference to FIGS. 12A and 12B, the horizontal axis represents the time domain.

The arrows 1001 to 1010 represent CSI reporting occasions. The arrow 1201 represents a time to send information about processing the CSI to the base station device 103. The duration 1211 represents a gap (or an offset) from the occasion 1201 (e.g., the time the terminal device 101 sends the information to the BS 103) to the time point at which the duration 1212 starts.

With reference to FIG. 12A, the duration 1212 represents a single duration where the wireless transmission and reception unit 10 may stop processing the CSI. With reference to FIG. 12B, the durations 1212-1214 are multiple durations where the wireless transmission and reception unit 10 may stop processing the CSI. The durations 1212-1214, in some implementations, may be periodic. The durations 1212-1214, in some implementations, may be aperiodic. Some implementations may not include the gap 1211. In these implementations, the duration 1212 may start immediately after the time 1201. In other words, in these implementations, the length of the duration 1211 may be zero.

The wireless transmission and reception unit 10 may not stop processing the CSI when the occasion of a CSI report is not within the duration 1212 of FIG. 12A or the durations 1212-1214 of FIG. 12B. The wireless transmission and reception unit 10 may stop processing the CSI when the occasion of a CSI report is within the duration of FIG. 12A or the durations 1212-1214 of FIG. 12B.

In the occasion 1201, the terminal device 101 (e.g., the wireless transmission and reception unit 10) may transmit a PUCCH or a PUSCH carrying the UCI which may include the information about processing the CSI. In the occasion 1201, the terminal device 101 may transmit a PUSCH carrying a MAC CE which may include the information about processing the CSI. The terminal device 101 may transmit a PUSCH carrying an RRC parameter which may include the information about processing the CSI. The RRC parameter may be sent in an RRC message that carried the RRC reconfiguration. The RRC parameter may be sent in an RRC message for an RRC setup.

Figure 13A:
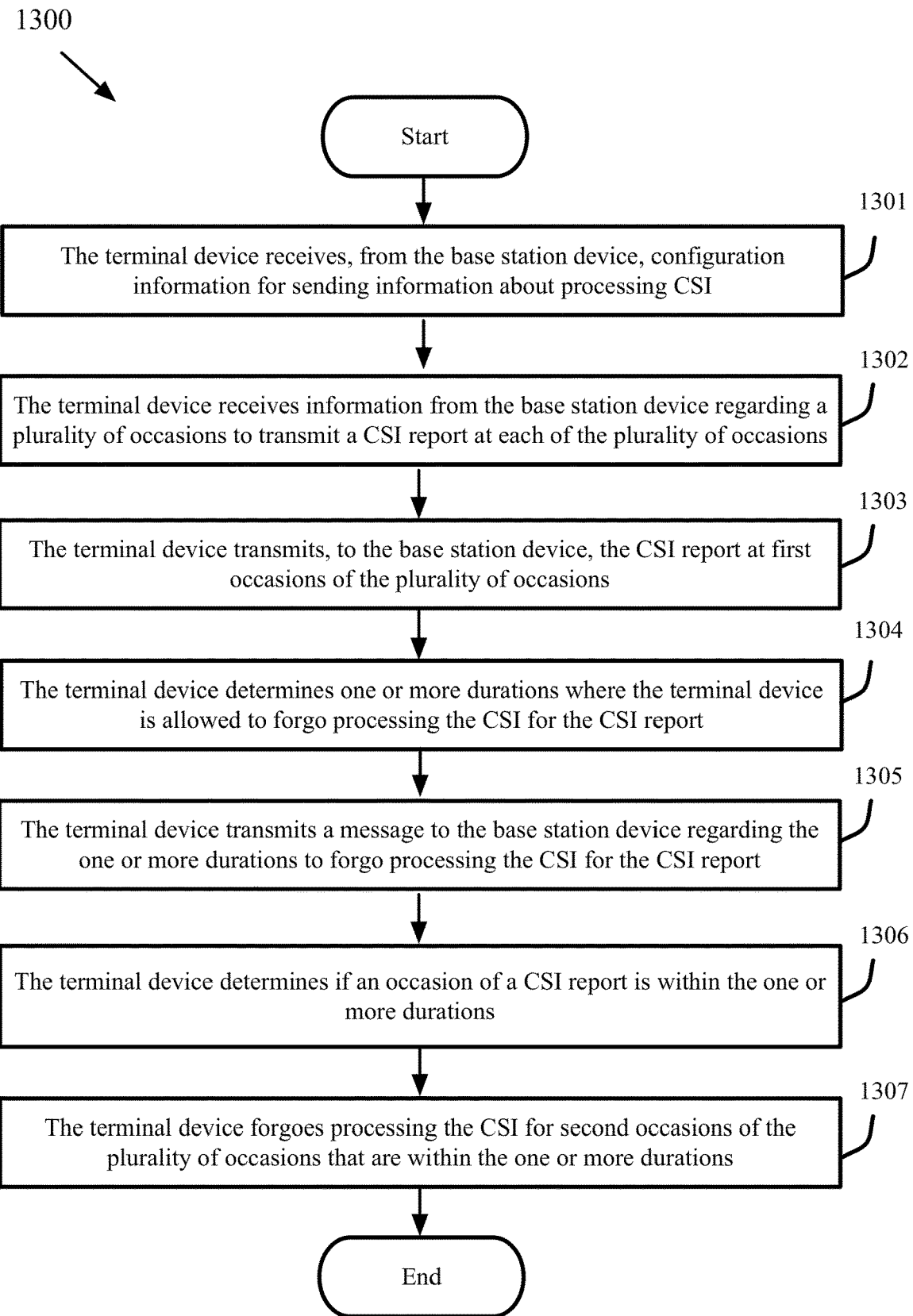
FIG. 13A is a flowchart illustrating an example method/process performed by a terminal device to forego the CSI processing at one or more occasions (e.g., during one or more durations), according to an example implementation of the present disclosure.

FIG. 13A is a flowchart illustrating an example method/process performed by a terminal device to forego the CSI processing at one or more occasions (e.g., during one or more durations), according to an example implementation of the present disclosure.

With reference to FIG. 13A, the process 1300 may be performed by at least one processor of the terminal device 101 of FIGS. 1 and 6. At block 1301, the terminal device 101 may receive from the base station device 103 configuration information for sending information about processing the CSI. The configuration information may include information indicating whether sending the information about processing the CSI is allowed or not. The configuration information may include information for identifying one or more occasions during which the terminal device 101 may send information about processing the CSI. The configuration information may be sent from the base station device 103 to the terminal device 101 using one or more RRC parameters or through DCI (or a MAC CE). When the configuration information is not sent from the base station device 103 to the terminal device 101, block 1301 may be omitted.

The configuration information may include information for identifying the length or the location of the one or more occasions during which the terminal device 101 may send information about processing the CSI. The configuration information may include information for identifying a gap from the occasion at which the information about processing the CSI is sent to the time point at which the duration 1212 starts. The configuration information may include information for identifying the length or the location of a gap from the occasion at which the information about processing the CSI is sent to the time point at which the duration 1212 starts.

At block 1302, the terminal device 101 may receive information from the base station device 103 regarding one or more occasions to transmit a CSI report at each of the one or more occasions. For example, the terminal device 101 may receive information regarding the occasions 1001-1010, as described above with reference to FIG. 12A-12B. The information may be received from the base station device 103 through an RRC message, a MAC CE, or via DCI.

At block 1303, the terminal device 101 may transmit the CSI report at first occasions of the one or more occasions to the base station device 103. For example, the terminal device 101 may transmit the CSI report to the base station device 103 in occasions 1001-1004 of FIGS. 12A-12B.

At block 1304, the terminal device 101 may determine one or more durations where the terminal device 101 is allowed to forgo processing the CSI for the CSI report. For example, the wireless transmission and reception unit 10 of the terminal device 101 may determine the duration 1212 of FIG. 12A or the durations 1212-1214 of FIG. 12B, as the durations where the terminal device 101 is allowed to forgo processing the CSI for the CSI report. The terminal device 101 may also determine a gap (e.g., the period 1211 of FIGS. 12A-12B) where the first one of the one or more durations may start after the offset.

At block 1305, the terminal device 101 may transmit a message to the base station device 103 regarding the one or more durations to forgo processing the CSI for the CSI report. Alternatively, at block 1305, the wireless transmission and reception unit 10 of the terminal device 101 may transmit information about processing the CSI in an occasion when an indication to stop processing the CSI is received from the higher-layer processing unit 16. The terminal device 101 may transmit the message to the base station device 103 through an RRC message, a MAC CE, or the UCI.

The terminal device 101 may transmit the information about processing the CSI as part of the UCI, for example, in an occasion using a PUCCH or a PUSCH. The terminal device 101 may transmit the information about processing the CSI in a MAC CE in an occasion using a PUSCH. The terminal device 101 may send the information about processing the CSI as part of the RRC parameters in an occasion using a PUSCH.

At block 1306, the wireless transmission and reception unit 10 of the terminal device 101 may determine if an occasion of a CSI report is within the one or more durations where the terminal device 101 is allowed to forgo processing the CSI for the CSI report.

At block 1307, the wireless transmission and reception unit 10 of the terminal device 101 may forgo processing the CSI for second occasions of the plurality of occasions that are within the one or more durations. The wireless transmission and reception unit 10 may not stop processing the CSI when the occasion of the CSI report is not within the duration 1212 of FIG. 12A or the durations 1212-1214 of FIG. 12B.

Figure 13B:
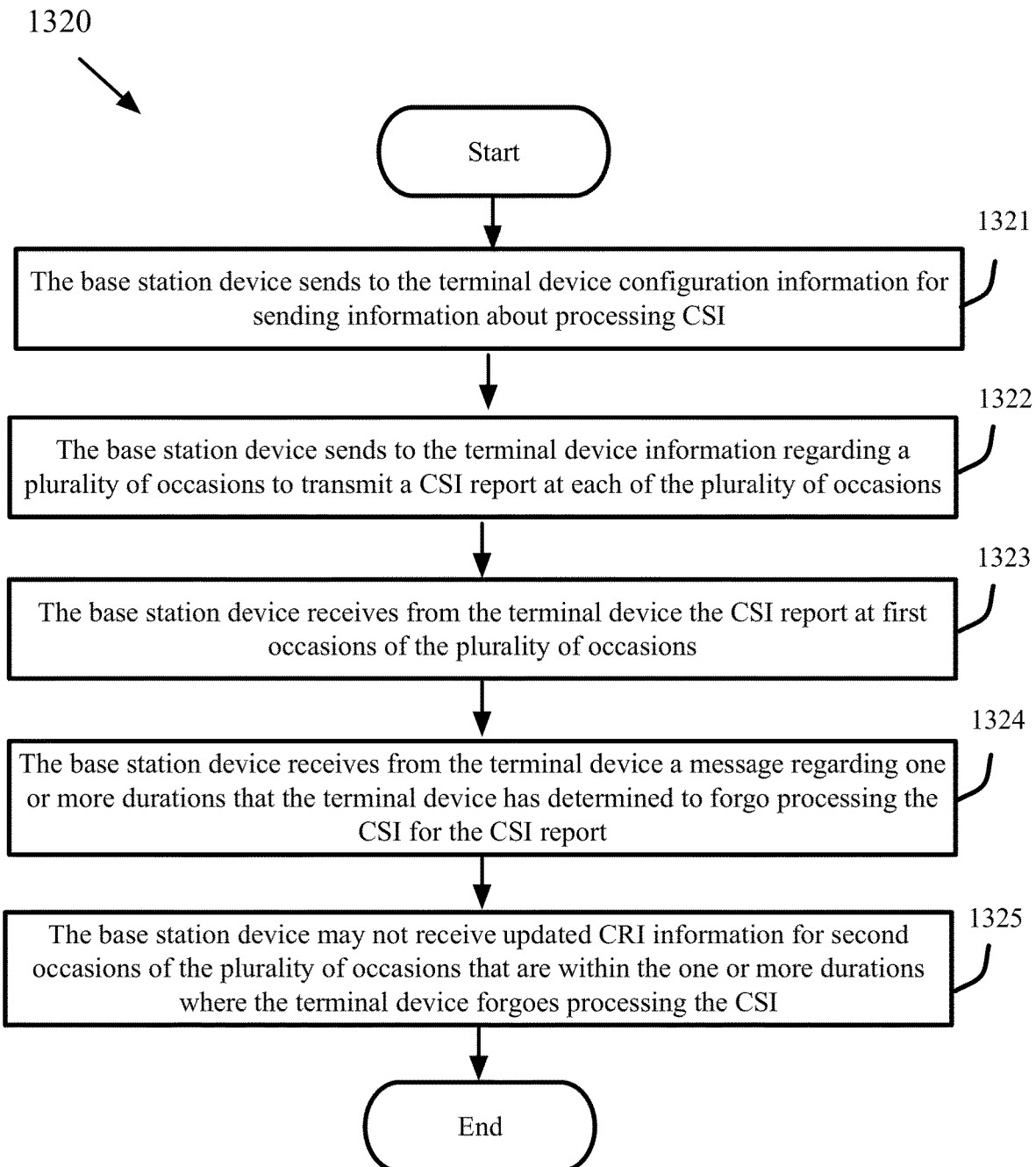
FIG. 13B is a flowchart illustrating an example method/process performed by a base station when a UE forgoes the CSI processing at one or more occasions (e.g., during one or more durations), according to an example implementation of the present disclosure.

FIG. 13B is a flowchart illustrating an example method/process performed by a base station device 103 when a UE forgoes the CSI processing at one or more occasions (e.g., during one or more durations), according to an example implementation of the present disclosure.

With reference to FIG. 13B, the process 1320 may be performed by at least one processor of the base station device 103 of FIGS. 1 and 5. At block 1321, the base station device 103 may send to the terminal device 101 configuration information for sending information about processing the CSI. The configuration information may include information indicating whether sending the information about processing the CSI is allowed or not. The configuration information may include information for identifying one or more occasions during which the terminal device may send information about processing the CSI. The configuration information may be sent from the base station device 103 to the terminal device 101 using one or more RRC parameters. When the configuration information is not sent from the base station device 103 to the terminal device 101, block 1321 may be omitted.

The configuration information may include information for identifying the length or the location of the one or more occasions during which the terminal device 101 may send information about processing the CSI. The configuration information may include information for identifying a gap from the occasion at which the information about processing the CSI is sent to the time point at which the duration 1212 starts. The configuration information may include information for identifying the length or the location of a gap from the occasion at which the information about processing the CSI is sent to the time point at which the duration 1212 starts.

At block 1322, the base station device 103 may send to the terminal device 101 information regarding one or more occasions to transmit a CSI report at each of the one or more occasions. For example, the base station device 103 may send information regarding the occasions 1001-1010, as described above with reference to FIG. 12A-12B. The information may be sent by the base station device 103 through an RRC message, a MAC CE, or the DCI.

At block 1323, the base station device 103 may receive from the terminal device 101 the CSI report at first occasions of the one or more occasions. For example, the base station device 103 may receive the CSI report from the terminal device 101 in occasions 1001-1004 of FIGS. 12A-12B.

At block 1324, the base station device 103 may receive from the wireless transmission and reception unit 10 of the terminal device 101 a message regarding one or more durations (e.g., the duration 1212 of FIG. 12A or the durations 1212-1214 of FIG. 12B) that the terminal device 101 has determined to forgo processing the CSI for the CSI report. For example, base station device 103 may receive the information regarding the duration 1212 of FIG. 12A or the durations 1212-1214 of FIG. 12B.

Alternatively, at block 1324, the base station device 103 may receive from the wireless transmission and reception unit 10 of the terminal device 101 the information about processing the CSI in an occasion in a case that an indication to stop processing the CSI is received by the wireless transmission and reception unit 10 of the terminal device 101 from the higher-layer processing unit 16.

The base station device 103 may receive information about processing the CSI as part of the UCI in an occasion through a PUCCH or a PUSCH from the terminal device 101. The base station device 103 may receive information about processing the CSI in a MAC CE in an occasion through a PUSCH from the terminal device 101. The base station device 103 may receive information about processing the CSI as a part of RRC parameters in an occasion through a PUSCH from the terminal device 101.

At block 1325, the base station device 103 may not receive updated CSI information (e.g., updated CSI reports) for second occasions of the one or more occasions that are within the one or more durations where the terminal device 101 forgoes processing the CSI. For example, the base station device 103 may not receive updated CSI information for the occasions 1006-1007 of FIG. 12A or the occasions 1006, 1008, and 1010 of FIG. 12B.

Figure 14A:
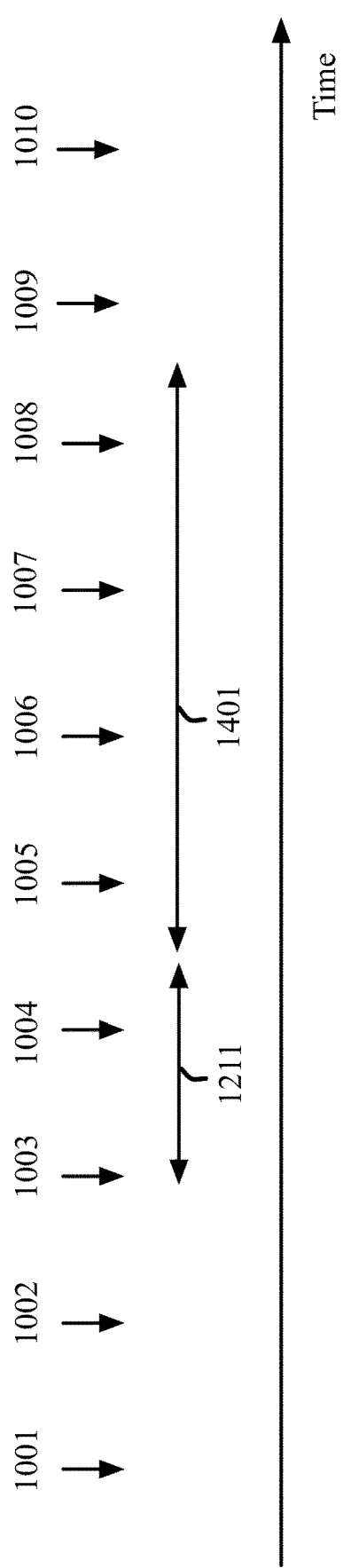
FIGS. 14A and 14B are timing diagrams illustrating examples of a procedure for sending information about CSI processing from a UE to a base station, according to an example implementation of the present disclosure.
Figure 14B:
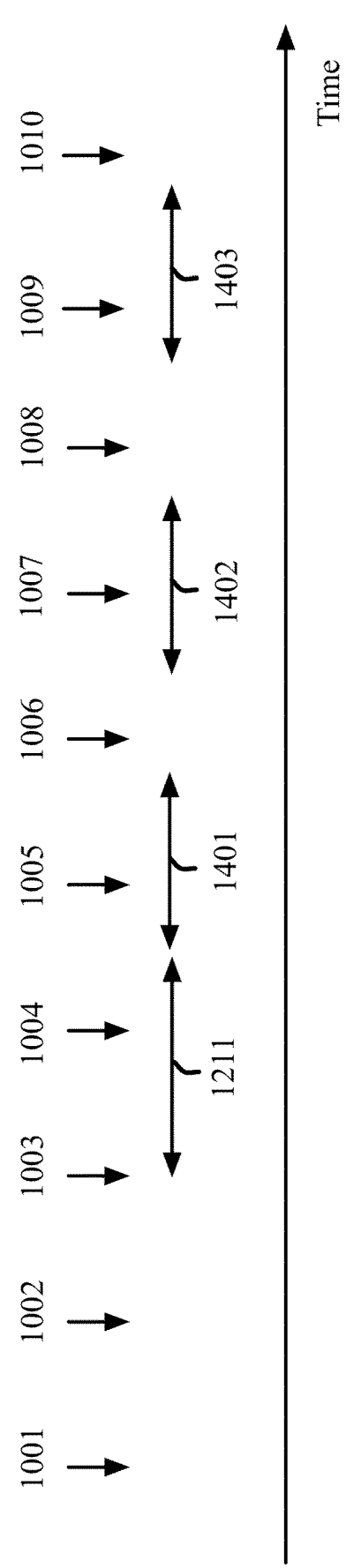

FIGS. 14A and 14B are timing diagrams illustrating examples of a procedure for sending information about CSI processing from a UE to a base station, according to an example implementation of the present disclosure. The horizontal axis represents the time domain. The arrows 1001 to 1010 represent CSI reporting occasions.

The information about processing the CSI is sent in occasion 1003. Therefore, the duration 1211 starts at occasion 1003. The duration 1211 represents a gap (or an offset) from the occasion 1003 to the time point at which the duration 1401 starts.

With reference to FIG. 14A, the duration 1401 represents a single duration where the wireless transmission and reception unit 10 of the terminal device 101 may stop processing the CSI. With reference to FIG. 14B, the durations 1401-1403 are multiple durations where the wireless transmission and reception unit 10 may stop processing the CSI. The durations 1401-1403, in some implementations, may be periodic. The durations 1401-1403, in some implementations, may be aperiodic. Some implementations may not include the gap 1211. In these implementations, the duration 1401 may start immediately after the time 1003.

The information about processing the CSI may be included in the UCI with the CSI as part of the UCI. The information about processing the CSI may be sent using a specific code point of a first information field. The information about processing the CSI may be sent using a combination of a part or all of (i) the first specific code point of the first information field, (ii) the second specific code point of the second information field, and (iii) the third specific code point of the third information field.

For example, the information about processing the CSI may be sent using the first specific code point of the CQI field and the second specific code point of the RI field. The information about processing the CSI may be sent using the code point '0' in decimal number of the CQI field and the specific code point which indicates the maximum transmission rank configured for the CSI report of the RI field. The information about processing the CSI may be sent using the code point '0' in decimal number of the CQI field and the specific code point which is reserved (or not used) for the CSI report.

The wireless transmission and reception unit 10 may not stop processing the CSI when an indication to stop processing the CSI is received from the higher-layer processing unit 16. The wireless transmission and reception unit 10 may stop processing the CSI when an indication to stop processing the CSI is received from the higher-layer processing unit 16.

In occasion 1003, the wireless transmission and reception unit 10 may transmit a PUCCH or a PUSCH carrying the UCI which may include the information about processing the CSI, for example, in addition to, or instead of, the normal CSI information that is carried by the UCI. In occasion 1003, the wireless transmission and reception unit 10 may transmit a PUSCH carrying a MAC CE which may include the information about processing the CSI.

Figure 15A:
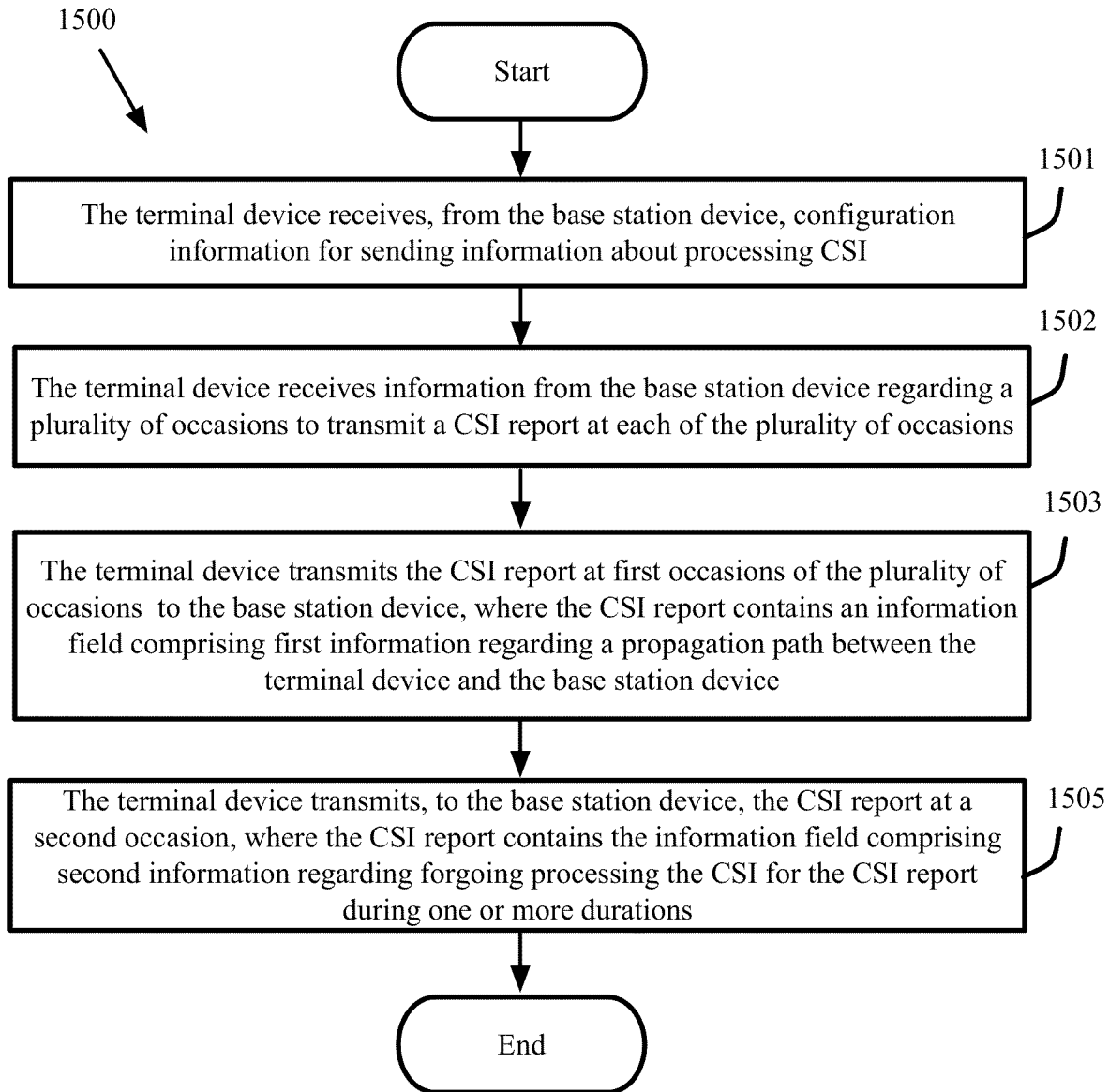
FIG. 15A is a flowchart illustrating an example method/process performed by a terminal device to forego CSI processing at one or more occasions (e.g., during one or more durations) after informing the base station, according to an example implementation of the present disclosure.

FIG. 15A is a flowchart illustrating an example method/ process performed by a terminal device 101 to forego the CSI processing at one or more occasions (e.g., during one or more durations) after informing the base station device 103, according to an example implementation of the present disclosure. With reference to FIG. 15A, the process 1500 may be performed by at least one processor of the terminal device 101 of FIGS. 1 and 6.

At block 1501, the terminal device 101 may receive, from the base station device 103, configuration information for sending information about processing the CSI. The configuration information may include information indicating whether sending the information about processing the CSI is allowed or not. The configuration information may include information for determining one or more occasions during which the terminal device 101 is allowed to send information about processing the CSI. The configuration information may include information for identifying the duration 1401 of FIG. 14A or the durations 1401-1403 of FIGS. 14A-14C. The configuration information may include information for identifying the length or the location of the duration 1401. The configuration information may include information for identifying the gap 1211. The configuration information may include information for identifying the length or the location of the gap 1211.

The configuration information may be sent from the base station device 103 to the terminal device 101 using one or more RRC parameters. The configuration information may include a part or all of the information to determine the periodicity of the durations 1401-1403, information to determine the start of the duration 1401 within a period determined by the periodicity, and information to determine the length of the durations 1401-1403.

The configuration information may include the number of CSI reporting attempts from the first occasion to send the information about processing the CSI. When the configuration information is not sent from the base station device 103 to the terminal device 101, the block 1501 may be omitted.

At block 1502, the terminal device 101 may receive information from the base station device 103 regarding multiple occasions to transmit a CSI report at each of the multiple occasions. For example, the terminal device 101 may receive the information regarding the occasions 1001-1010, as described above with reference to FIGS. 14A-14B.

At block 1503, the terminal device 101 may transmit the CSI report to the base station device 103 at first occasions of the multiple occasions. The CSI report may contain an information field including first information regarding CSI, such as a propagation path between the terminal device 101 and the base station device 103. The terminal device 101 may transmit the CSI report containing an information field including first information regarding a propagation path between the terminal device 101 and the base station device 10 at the occasion 1001 or 1002 of FIGS. 14A-14B. At block 1503, the wireless transmission and reception unit 10 may transmit information about processing the CSI in an occasion in a case that an indication to stop processing the CSI is received from the higher-layer processing unit 16. The wireless transmission and reception unit 10 may send the information about processing the CSI as a part of the UCI in an occasion using a PUCCH or a PUSCH.

At block 1504, the terminal device 101 may transmit the CSI report at a second occasion to the base station 103. Prior to transmitting the CSI report, the wireless transmission and reception unit 10 of the terminal device 101 may determine one or more durations where the terminal device is allowed to forgo processing the CSI for the CSI report. For example, the wireless transmission and reception unit 10 of the terminal device 101 may determine the duration 1401 of FIG. 14A or durations 1401-1403 of FIG. 14B, as the durations where the terminal device is allowed to forgo processing the CSI for the CSI report. The terminal device 101 may also determine a gap (e.g., the period 1211 of FIGS. 14A-14B) where the first one of the determined one or more durations starts after the offset.

The CSI report may contain the information field also including second information regarding forgoing processing the CSI for the CSI report. It should be noted that in different implementations, the second information regarding forgoing processing the CSI for the CSI report may be included in the same, or in a different, information field than the information field that is used at block 1503 for the information regarding the propagation path between the terminal device 101 and the base station device 103.

The terminal device 101, in the occasion 1003 of FIGS. 14A-14B, may transmit the CSI report, where the CSI report may contain the information field including second information regarding forgoing processing the CSI for the CSI report.

After transmitting the CSI report at block 1504, the terminal device 101 may forgo processing the CSI for third occasions of the determined one or more occasions that are within the one or more durations. For example, the terminal device 101 may forgo processing the CSI for the occasions 1005-1008 of FIG. 14A or the occasions 1005, 1007, and 1009 of FIG. 14B.

For example, wireless transmission and reception unit 10 of the terminal device 101 may forgo processing the CSI when the occasion of the CSI report is within the duration 1401 of FIG. 14A or durations 1401-1403 of FIG. 14B. The wireless transmission and reception unit 10 may not stop processing the CSI in a case that the occasion of the CSI report is not within the duration 1401 of FIG. 14A or the durations 1401-1403 of FIG. 14B.

Figure 15B:
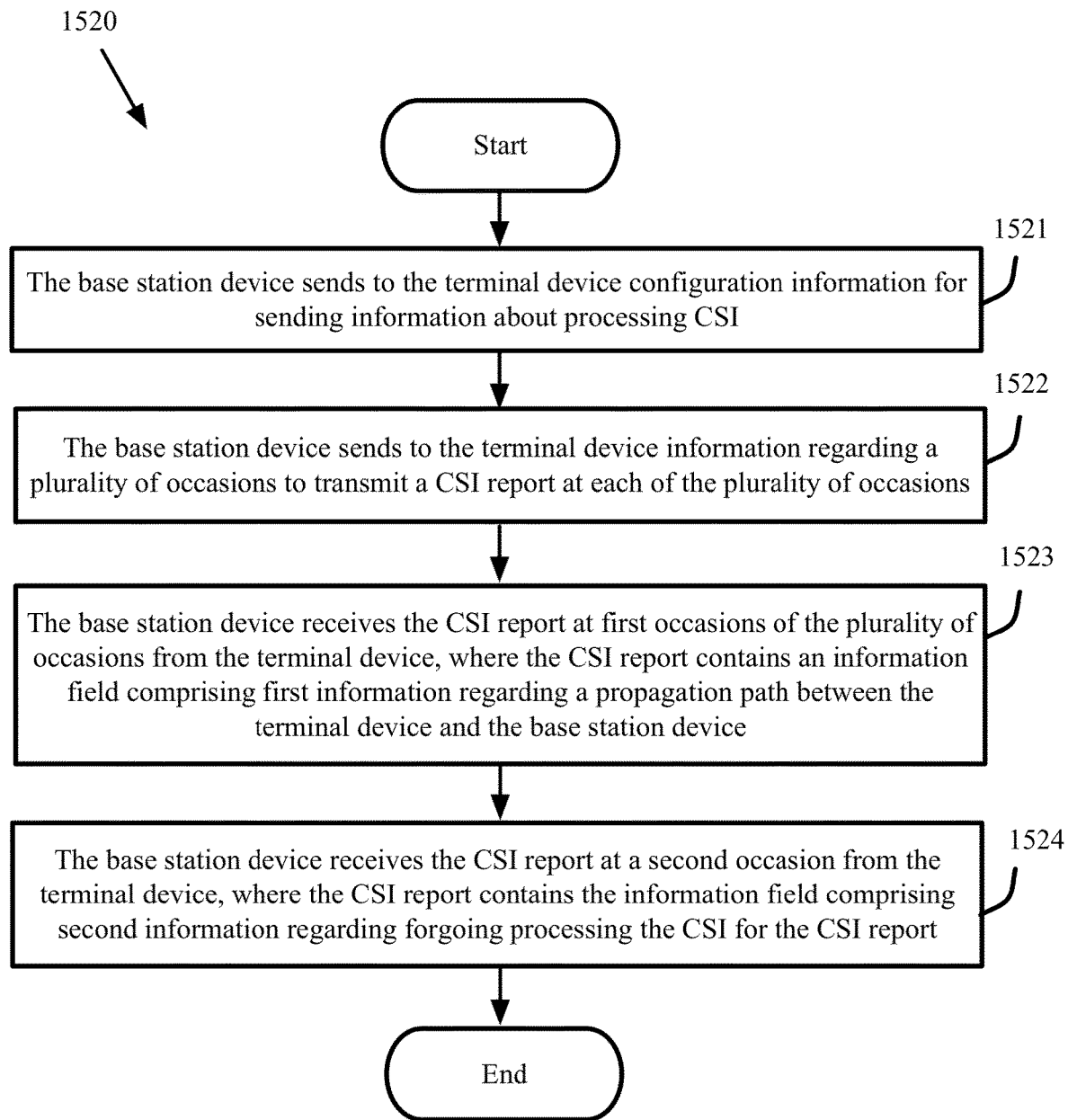
FIG. 15B is a flowchart illustrating an example method/process performed by a base station when a terminal device foregoes the CSI processing at one or more occasions (e.g., during one or more durations), according to an example implementation of the present disclosure.

FIG. 15B is a flowchart illustrating an example method/process performed by a base station when a terminal device foregoes the CSI processing at one or more occasions (e.g., during one or more durations), according to an example implementation of the present disclosure.

With reference to FIG. 15B, the process 1520 may be performed by at least one processor of the base station device 103 of FIGS. 1 and 5. At block 1521, the base station device 103 may send to the terminal device 101 configuration information for sending information about processing the CSI. The configuration information may include information indicating whether sending the information about processing the CSI is allowed or not. The configuration information may include information for determining one or more occasions in which the terminal device 101 is allowed to send information about processing the CSI. For example, the configuration information may include information for determining the duration 1401 of FIG. 14A or the durations 1401-1403 of FIGS. 14A-14C.

The configuration information may be sent from the base station device 103 to the terminal device 101 using one or more RRC parameters. The configuration information may include a part or all of information to determine periodicity of the durations 1401-1403, information to determine start of the duration 1401 within a period determined by the periodicity, and information to determine length of the durations 1401-1403.

The configuration information may include the number of CSI reporting attempts from the first occasion to send information about processing the CSI. When the configuration information is not sent from the base station device 103 to the terminal device 101, the block 1521 may be omitted.

At block 1522, the base station device 103 may send to the terminal device 101 information regarding multiple occasions to transmit a CSI report at each of the plurality of occasions. For example, the base station device 103 may send information regarding the plurality of occasions 1001-1010 as described above with reference to FIGS. 14A-14B.

At block 1523, the base station device 103 may receive the CSI report at first occasions of the plurality of occasions from the terminal device 10. The CSI report may contain an information field including first information regarding a propagation path between the terminal device 101 and the base station device 103. For example, the base station device 103 may receive the CSI report that contains an information field including first information regarding a propagation path between the terminal device 101 and the base station device 10 at the occasion 1001 or 1002 of FIGS. 14A-14B.

The base station device 103 may receive from the wireless transmission and reception unit 10 of the terminal device 101 information about processing the CSI in an occasion when an indication to stop processing the CSI is received from the higher-layer processing unit 16. The base station device 103 may receive information about processing the CSI as a part of UCI in an occasion through a PUCCH or a PUSCH from the terminal device 101.

At block 1524, the base station 103 may receive the CSI report at a second occasion from the terminal device 101. The CSI report may contain the information field including second information regarding forgoing processing the CSI for the CSI report. For example, the base station 103 in the occasion 1003 of FIGS. 14A-14B receives the CSI report, where the CSI report contains the information field including second information regarding forgoing processing the CSI for the CSI report. It should be noted that in different implementations, the second information regarding forgoing processing the CSI for the CSI report may be included in the same, or in a different, information field than the information field that is used at block 1523 for the information regarding the propagation path between the terminal device 101 and the base station device 10.

The base station device 103 may not receive updated CSI information when the terminal device 101 forgoes processing the CSI for third occasions of the plurality of occasions that are within the one or more durations. For example, the base station device may not receive updated CSI information for the occasions 1005-1008 of FIG. 14A or the occasions 1005, 1007, and 1009 of FIG. 14B. For example, at block 1525, the base station device 103 may not receive updated CSI information when the wireless transmission and reception unit 10 of the terminal device 101 stops processing the CSI in a case that the occasion of the CSI report is within the duration 1401 of FIG. 14A or durations 1401-1403 of FIG. 14B.

The various foregoing example embodiments and modes may be utilized in conjunction with one another, e.g., in combination with one another.

Each of a program running on the base station device 103 and the terminal device 101 according to an aspect of the present invention may be a program that controls a Central Processing Unit (CPU) and the like, such that the program causes a computer to operate in such a manner as to realize the functions of the above-described embodiment according to the present invention. The information handled in these devices is transitorily stored in a Random-Access-Memory (RAM) while being processed. Thereafter, the information is stored in various types of Read-Only-Memory (ROM) such as a Flash ROM and a Hard-Disk-Drive (HDD), and when necessary, is read by the CPU to be modified or rewritten.

Note that the terminal device 101 and the base station device 103 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" mentioned here refers to a computer system built into the terminal device 101 or the base station device 103, and the computer system includes an OS and hardware components such as a peripheral device. Furthermore, the "computer-readable recording medium" refers to a portable medium such as a flexible disk, a magneto-optical disk, a ROM, a CD-ROM, and the like, and a storage device built into the computer system such as a hard disk.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, the base station device 103 according to the above-described embodiment may be achieved as an aggregation (a device group) including multiple devices. Each of the devices configuring such a device group may include some or all of the functions or the functional blocks of the base station device 103 according to the above-described embodiment. The device group may include each general function or each functional block of the base station device 103. Furthermore, the terminal device 101 according to the above-described embodiment can also communicate with the base station device as the aggregation.

Furthermore, the base station device 103 according to the above-described embodiment may serve as an Evolved Universal Terrestrial Radio Access Network (E-UTRAN) and/or NG-RAN (Next Gen RAN, NR-RAN). Furthermore, the base station device 103 according to the above-described embodiment may have some or all of the functions of a node higher than an eNodeB or the gNB.

Furthermore, some or all portions of each of the terminal device 101 and the base station device 103 according to the above-described embodiment may be typically achieved as an LSI which is an integrated circuit or may be achieved as a chip set. The functional blocks of each of the terminal device 101 and the base station device 103 may be individually achieved as a chip, or some or all of the functional blocks may be integrated into a chip. Furthermore, a circuit integration technique is not limited to the LSI, and may be realized with a dedicated circuit or a general-purpose processor. Furthermore, in a case that with advances in semiconductor technology, a circuit integration technology with which an LSI is replaced appears, it is also possible to use an integrated circuit based on the technology.

Furthermore, according to the above-described embodiment, the terminal device 101 has been described as an example of a communication device, but the present invention is not limited to such a terminal device, and is applicable to a terminal device or a communication device of a fixed-type or a stationary-type electronic device installed indoors or outdoors, for example, such as an Audio-Video (AV) device, a kitchen device, a cleaning or washing machine, an air-conditioning device, office equipment, a vending machine, and other household devices.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

What is claimed is:

1. A user equipment (UE), comprising:
one or more non-transitory computer-readable media storing one or more computer-executable instructions for processing channel state information (CSI); and
at least one processor coupled to the one or more non-transitory computer-readable media, and configured to execute the one or more computer-executable instructions to cause the UE to:
receive information from a base station (BS) regarding a plurality of occasions to transmit a CSI report at each of the plurality of occasions;
transmit, to the BS, the CSI report at first occasions of the plurality of occasions;
transmit a message to the BS regarding one or more durations to forgo processing the CSI for the CSI report; and
forgo processing the CSI for second occasions of the plurality of occasions that are within the one or more durations.

2. The UE of claim 1, wherein the at least one processor is further configured to execute the one or more computer-executable instructions to cause the UE to:
process the CSI for third occasions of the plurality of occasions that are not within the one or more durations after transmitting the message to the BS.

3. The UE of claim 1, wherein the at least one processor is further configured to execute the one or more computer-executable instructions to cause the UE to:
  determine an offset that starts after transmitting the message,
    wherein a first one of the one or more durations starts after the offset.

4. The UE of claim 1, wherein receiving the information from the BS comprises receiving the information from the BS through one of a radio resource control (RRC) message, a medium access control (MAC) control element (CE), or downlink control information (DCI).

5. The UE of claim 1, wherein transmitting the message to the BS comprises transmitting the message to the BS through one of a radio resource control (RRC) message, a medium access control (MAC) control element (CE), or uplink control information (UCI).

6. The UE of claim 1, wherein forgoing processing the CSI comprises forgoing updating the CSI for the CSI report.

7. The UE of claim 1, further comprising:
  a higher-layer processing unit configured to transmit an indication to forgo processing the CSI; and
  a wireless transmission reception unit configured to forgo processing the CSI for the CSI report for the second occasions after receiving the indication from the higher-layer processing unit.

8. A method of processing channel state information (CSI) performed by a user equipment (UE), the method comprising:
  receiving information from a base station (BS) regarding a plurality of occasions to transmit a CSI report at each of the plurality of occasions;
  transmitting a message to the BS regarding one or more durations to forgo processing the CSI for the CSI report;
  processing the CSI for first occasions of the plurality of occasions that are not within the one or more durations; and
  forgoing processing the CSI for second occasions of the plurality of occasions that are within the one or more durations.

9. A user equipment (UE), comprising:
  one or more non-transitory computer-readable media storing one or more computer-executable instructions for processing channel state information (CSI); and
  at least one processor coupled to the one or more non-transitory computer-readable media, and configured to execute the one or more computer-executable instructions to cause the UE to:
    receive information from a base station (BS) regarding a plurality of occasions to transmit a CSI report at each of the plurality of occasions;
    transmit, to the BS, the CSI report at first occasions of the plurality of occasions, the CSI report containing an information field comprising first information regarding a propagation path between the UE and the BS; and
    transmit, to the BS, the CSI report at a second occasion, the CSI report containing the information field comprising second information regarding forgoing processing the CSI for the CSI report during one or more durations.

10. The UE of claim 9, wherein the at least one processor is further configured to execute the one or more computer-executable instructions to cause the UE to:
  forgo processing the CSI for third occasions of the plurality of occasions that are within the one or more durations after transmitting the CSI report at the second occasion.

11. The UE of claim 10, wherein forgoing processing the CSI comprises forgoing updating the CSI for the CSI report.

12. The UE of claim 9, wherein the at least one processor is further configured to execute the one or more computer-executable instructions to cause the UE to:
  determine an offset to start after transmitting the CSI report at the second occasion,
    wherein a first one of the one or more durations starts after the offset.

13. The UE of claim 9, wherein the second information is transmitted using a first specific code point of a channel quality indicator (CQI) field and a second specific code point of a rank indicator (RI) field.

14. The UE of claim 9, wherein the second information is transmitted using a code point '0' in decimal number of a channel quality indicator (CQI) field and a specific code point that indicates a maximum transmission rank configured for a CSI report of a rank indicator (RI) field.

15. The UE of claim 9, further comprising:
  a higher-layer processing unit configured to transmit an indication to forgo processing the CSI; and
  a wireless transmission reception unit configured to forego processing the CSI for third occasions of the plurality of occasions that are within the one or more durations in response to receiving the indication.

* * * * *